US012697702B2

(12) United States Patent
Zhao et al.

(10) Patent No.: US 12,697,702 B2
(45) Date of Patent: Aug. 4, 2026

(54) ELECTRIC POWER TOOL

(71) Applicant: MAKITA CORPORATION, Anjo (JP)

(72) Inventors: Ding Zhao, Anjo (JP); Daiki Imaida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/081,720

(22) Filed: Mar. 17, 2025

(65) Prior Publication Data

US 2025/0312896 A1 Oct. 9, 2025

(30) Foreign Application Priority Data

Apr. 5, 2024 (JP) ................................ 2024-061412

(51) Int. Cl.

*B25B 21/02* (2006.01)
*B25B 23/18* (2006.01)
*B25F 5/00* (2006.01)
*B25F 5/02* (2006.01)

(52) U.S. Cl.

CPC .............. *B25B 21/02* (2013.01); *B25B 23/18* (2013.01); *B25F 5/001* (2013.01); *B25F 5/006* (2013.01); *B25F 5/02* (2013.01)

(58) Field of Classification Search

CPC ......... B25B 21/02; B25B 23/18; B25F 5/001; B25F 5/006; B25F 5/02

See application file for complete search history.

(56) References Cited

U.S. PATENT DOCUMENTS

| | | | | |
|---|---|---|---|---|
| 9,022,888 | B2 * | 5/2015 | McClung | B25B 21/026 475/149 |
| 9,550,284 | B2 * | 1/2017 | Seith | B25F 5/02 |
| 11,478,908 | B2 * | 10/2022 | Teng | B25B 23/00 |
| 2023/0398665 | A1 * | 12/2023 | Aoki | B25B 21/02 |

FOREIGN PATENT DOCUMENTS

JP 5844970 B2 1/2016

* cited by examiner

*Primary Examiner* — Michelle Lopez
(74) *Attorney, Agent, or Firm* — Oliff PLC

(57) ABSTRACT

An electric power tool includes: a grip extending in a front-rear direction; a motor housing disposed forward of the grip; a motor disposed inside the motor housing and including a stator and a rotor, the rotor being rotatable with respect to the stator; a bevel gear configured to rotate integrally with the rotor and including a shaft extending in the front-rear direction; a spindle directly or indirectly rotated via the bevel gear and extending in a direction intersecting the front-rear direction; a tool accessory holder rotated by the spindle; a case to accommodate the bevel gear and the spindle; and a bearing held by the case and configured to hold the bevel gear to be rotatable.

17 Claims, 28 Drawing Sheets

ELECTRIC POWER TOOL

CROSS-REFERENCE TO RELATED APPLICATION(S)

The present application claims priority to and incorporates by reference the entire contents of Japanese Patent Application No. 2024-061412 filed in Japan on Apr. 5, 2024.

TECHNICAL FIELD

The techniques disclosed in the present teachings relate to an electric power tool.

BACKGROUND

JP 5844970 B discloses a pistol-shaped electric power tool. There is an angle electric power tool that enables work in a narrow place not allowing insertion of a distal end of a pistol-shaped electric power tool. The angle electric power tool has a rod-like shape with a bent distal end, in which a motor shaft and an output shaft are not parallel to each other. Therefore, the angle electric power tool makes it possible to perform fastening work with its distal end inserted into a narrow work place.

In order to use an angle electric power tool for work in a narrow place, downsizing of a portion including a gear and a bearing is required. In addition, when using a bevel gear to make the motor shaft and the output shaft non-parallel, there is a situation where a thrust load is generated in the bevel gear in association with transmission of the rotational force, leading to a necessity to appropriately hold the bevel gear.

One non-limiting object of the present teachings is to downsize a gear portion in an angle electric power tool. In addition, another one-limiting object of the present teachings is to appropriately hold a bevel gear in an angle electric power tool.

SUMMARY

In one-non-limiting aspect of the present teachings, an electric power tool includes: a grip extending in a front-rear direction; a motor housing disposed forward of the grip; a motor disposed inside the motor housing and including a stator and a rotor, the rotor being rotatable with respect to the stator; a bevel gear configured to rotate integrally with the rotor and including a shaft extending in the front-rear direction; a spindle directly or indirectly rotated via the bevel gear and extending in a direction intersecting the front-rear direction; a tool accessory holder rotated by the spindle; a case to accommodate the bevel gear and the spindle; and a bearing held by the case and configured to hold the bevel gear to be rotatable.

According to the present teachings, it is possible to downsize a gear portion in the angle electric power tool.

DETAILED DESCRIPTION

Figure 1:
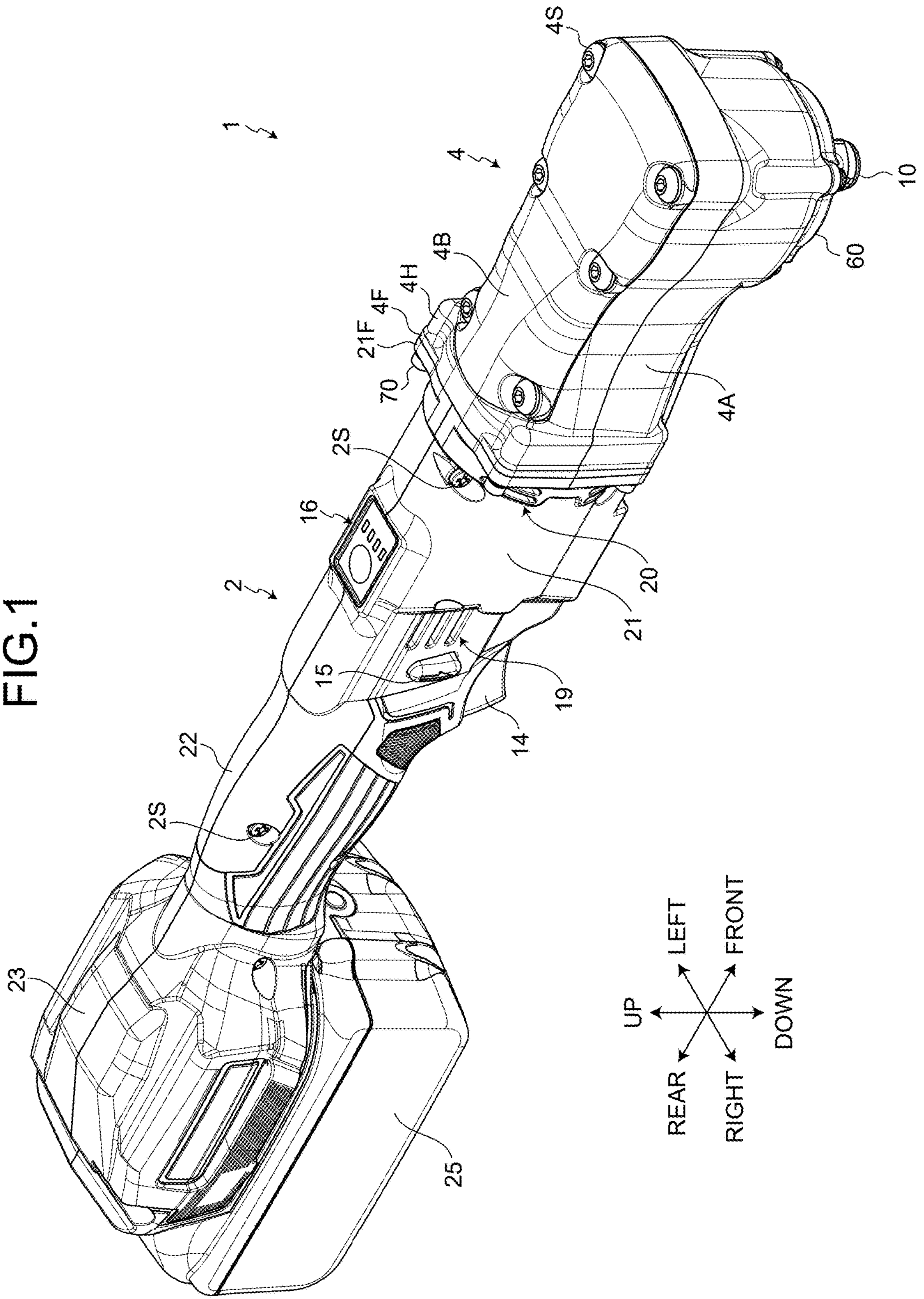
FIG. 1 is a perspective view illustrating an electric power tool according to an embodiment.

In one or more embodiments, the electric power tool may include: a grip extending in a front-rear direction; a motor housing disposed forward of the grip; a motor disposed inside the motor housing and having a stator and a rotor, the rotor being rotatable with respect to the stator; a bevel gear configured to rotate integrally with the rotor and having a shaft extending in the front-rear direction; a spindle directly or indirectly rotated via the bevel gear and extending in a direction intersecting the front-rear direction; a tool accessory holder rotated by the spindle; a case to accommodate the bevel gear and the spindle; and a bearing held by the case and configured to hold the bevel gear to be rotatable.

In the above configuration, the bevel gear rotates integrally with the rotor, and the bearing is held by the case and holds the bevel gear to be rotatable. Thus, the bearing can be held, together with the bevel gear, by the case. There is no need to provide a holding member such as a case or a bracket dedicated to bearings separately from the case, making it possible to downsize a gear portion of the electric power tool.

In one or more embodiments, the electric power tool may further include: a hammer rotated by the spindle; and an anvil directly or indirectly impacted by the hammer in the rotation direction. The tool accessory holder may be disposed at a lower end of the anvil. The case may accommodate the bevel gear, the spindle, and the hammer.

With the above configuration, it is possible to provide the impact tool capable of downsizing a gear portion.

In one or more embodiments, the rotor may have a rotor shaft that extends in the front-rear direction. The rotor shaft may extend from the motor housing to the internal space of the case. The bevel gear may be fixed to the rotor shaft.

In the above configuration, the bevel gear is used as a pinion gear fixed to the rotor shaft. The bearing that rotatably holds the bevel gear also enables rotational support of the rotor shaft. The rotational support of the rotor shaft and the rotational support of the bevel gear can be achieved by the same bearing.

In one or more embodiments, the bearing may contact the rotor shaft and hold the bevel gear to be rotatable via the rotor shaft.

The above configuration has no need to provide the bevel gear with a portion to be supported in contact with the bearing, enabling downsizing of the bevel gear.

In one or more embodiments, the case may include: a radial support surface that supports a radial load acting on the bearing; and a front support surface that supports a forward thrust load acting on the bearing. The motor housing and the case may be connected in the front-rear direction. The motor housing may have a rear support surface that supports a rearward thrust load acting on the bearing.

In the above configuration, the radial load and the forward thrust load caused by the transmission of the rotational force by the bevel gear can be supported by the case. The rearward thrust load caused by the transmission of the rotational force by the bevel gear can be supported by the motor housing. With the motor housing and the case, it is possible to hold the bearing and support the load.

In one or more embodiments, the electric power tool may further include an intermediate shaft disposed between the bevel gear and the spindle to transmit the rotation of the bevel gear to the spindle. The intermediate shaft may be accommodated in the case and extend in a direction intersecting the front-rear direction.

In the above configuration, the rotation of the bevel gear can be decelerated by the intermediate shaft and transmitted to the spindle. The entire length of the electric power tool in the front-rear direction can be shortened as compared with a situation where the intermediate shaft is directed in the front-rear direction.

In one or more embodiments, the electric power tool may further include: a first intermediate shaft that includes a driven gear meshing with the bevel gear and that decelerates rotation of the bevel gear; and a second intermediate shaft that decelerates rotation of the first intermediate shaft and transmits the rotation to the spindle.

In the above configuration, deceleration can be performed in a plurality of stages in the process of transmitting rotation to the spindle via the bevel gear. This makes it possible to obtain a high torque suitable for the electric power tool.

In one or more embodiments, the spindle may extend in a direction orthogonal to the front-rear direction.

With the above configuration, it is possible to obtain an angle electric power tool having the output shaft in the direction orthogonal to the front-rear direction and suitable for the work in the narrow place.

In one or more embodiments, the electric power tool may include: a grip extending in a front-rear direction; a motor housing disposed forward of the grip; a motor disposed inside the motor housing and having a stator and a rotor, the rotor being rotatable with respect to the stator; a pinion gear configured to rotate integrally with the rotor; a speed reducing mechanism connected to the pinion gear; a spindle connected to the speed reducing mechanism and extending in a direction intersecting the front-rear direction; a tool accessory holder rotated by the spindle; a case to accommodate the pinion gear, the speed reducing mechanism, and the spindle; and a bearing held by the case and configured to hold the pinion gear to be rotatable.

In the above configuration, the pinion gear rotates integrally with the rotor, and the bearing is held by the case and holds the pinion gear to be rotatable. Thus, the bearing can be held, together with the pinion gear, by the case. There is no need to provide a holding member such as a case or a bracket dedicated to bearings separately from the case, making it possible to downsize a gear portion of the electric power tool.

In one or more embodiments, the motor housing and the case may be connected to each other in the front-rear direction. The bearing may be clamped between the motor housing and the case.

In the above configuration, since the bearing is clamped between the motor housing and the case, the bearing can be held without increasing the number of components.

In one or more embodiments, the case may have an accommodating recess that is recessed forward from the rear of the case to accommodate the bearing. The motor housing may have a support wall that directly or indirectly supports the rear surface of the bearing on the front surface of the motor housing.

In the above configuration, by providing the accommodating recess for accommodating the bearing in the case, the radial load acting on the bearing and the forward thrust load can be supported by the case. The rearward thrust load acting on the bearing can be supported by the motor housing.

In one or more embodiments, the speed reducing mechanism may include: a first speed reducer connected to the pinion gear and configured to rotate to decelerate the rotation of the pinion gear; and a second speed reducer configured to decelerate the rotation of the first speed reducer and transmit the rotation to the spindle.

In the above configuration, deceleration can be performed in a plurality of stages in the process of transmitting rotation to the spindle. This makes it possible to obtain a high torque necessary for the electric power tool.

In one or more embodiments, the electric power tool may include: a grip extending in a front-rear direction; a motor housing disposed forward of the grip; a motor disposed inside the motor housing and having a stator and a rotor, the rotor being rotatable with respect to the stator; a bevel gear directly or indirectly rotated by the rotor and having a shaft extending in the front-rear direction; a spindle directly or indirectly rotated via the bevel gear and extending in a direction intersecting the front-rear direction; a tool accessory holder rotated by the spindle; a case to accommodate the bevel gear and the spindle; a bearing held by the case and configured to hold the bevel gear to be rotatable; an intermediate support member having a front surface coming in contact with the bearing; and a fixing member coming in contact with a rear surface of the intermediate support member to fix the intermediate support member, together with the case, only by clamping.

In the above configuration, the case supports the bearing that holds the bevel gear 35 to be rotatable, and the intermediate support member and the fixing member support the rear surface of the bearing. Even when a thrust load is generated with the transmission of the rotational force by the bevel gear, the thrust load can be supported by the case or the fixing member via the bearing. Since the intermediate support member coming in contact with the bearing is fixed by being clamped between the case and the fixing member, it is possible to prevent occurrence of a gap (backlash) in the thrust load acting direction of the bearing. As a result, the bevel gear can be appropriately held in the angle electric power tool. In addition, since the intermediate support member is fixed only by clamping, there is no need to provide a member such as a screw for fixing the intermediate support member. This achieves reduction of the number of parts and downsizing of a gear portion.

In one or more embodiments, one of the intermediate support member or the fixing member may elastically deform the other.

In the above configuration, since the dimensional tolerance can be absorbed by the elastic deformation, it is possible to reliably prevent occurrence of the gap (backlash) in the thrust load acting direction of the bearing.

In one or more embodiments, the bearing may include a ball bearing having an inner ring, an outer ring, and balls. The intermediate support member may be formed of metal and may come in contact with the outer ring. The fixing member may be formed of resin, and may be elastically deformed to clamp the intermediate support member.

In the above configuration, the intermediate support member, which is a portion coming in contact with the outer ring of the bearing, can be formed of metal to receive a thrust load, and the fixing member can be formed of resin to elastically deform. This makes it possible to achieve a structure that endures concentration of load when the thrust load is received from the outer ring while preventing occurrence of a gap (backlash) in the thrust load acting direction of the bearing.

In one or more embodiments, the width of the rear surface of the intermediate support member in the radial direction may be greater than the width of the outer ring in the radial direction.

In the above configuration, the contact area between the rear surface of the intermediate support member and the fixing member can be made larger than the contact area between the outer ring and the front surface of the intermediate support member. Therefore, when the thrust load is received from the outer ring, the contact area can be enlarged by the intermediate support member to reduce the surface pressure acting on the fixing member formed of resin.

In one or more embodiments, the intermediate support member may be formed of resin. The fixing member may be formed of metal and may clamp the intermediate support member while elastically deforming the intermediate support member.

The above configuration uses the intermediate support member as a spacer or a cushion, making it possible to prevent occurrence of a gap (backlash) in the thrust load acting direction of the bearing.

In one or more embodiments, the rotor may have a rotor shaft extending in the front-rear direction. The intermediate support member may be provided so as to surround the periphery of the rotor shaft along the rear surface of the bearing, and may have a C-shape including two ends, being one end and the other end.

The above configuration includes the intermediate support member having a C-shape, making it possible to assemble the intermediate support member to the rotor shaft from the radial direction at the assembly of the electric power tool. With this configuration, even when the assembly operator has assembled the components in an improper order, the intermediate support member can be assembled later, leading to enhancement of assembly workability.

In one or more embodiments, the intermediate support member may have a hoop shape along the rear surface of the bearing.

In the above configuration, the intermediate support member having a hoop shape can support the thrust load on the entire circumference of the bearing.

In one or more embodiments, the fixing member may be integrally formed with the motor housing.

The above configuration makes it possible to reduce the number of components as compared with the situation where the fixing member is provided as a member separate from the motor housing, achieving downsizing of a gear portion.

Hereinafter, embodiments will be described with reference to the drawings. In the embodiment, the positional relationship of each component will be described using terms of "left", "right", "front", "rear", "up", and "down". These terms indicate the relative position or direction with respect to the center of the electric power tool.

First Embodiment

Figure 2:
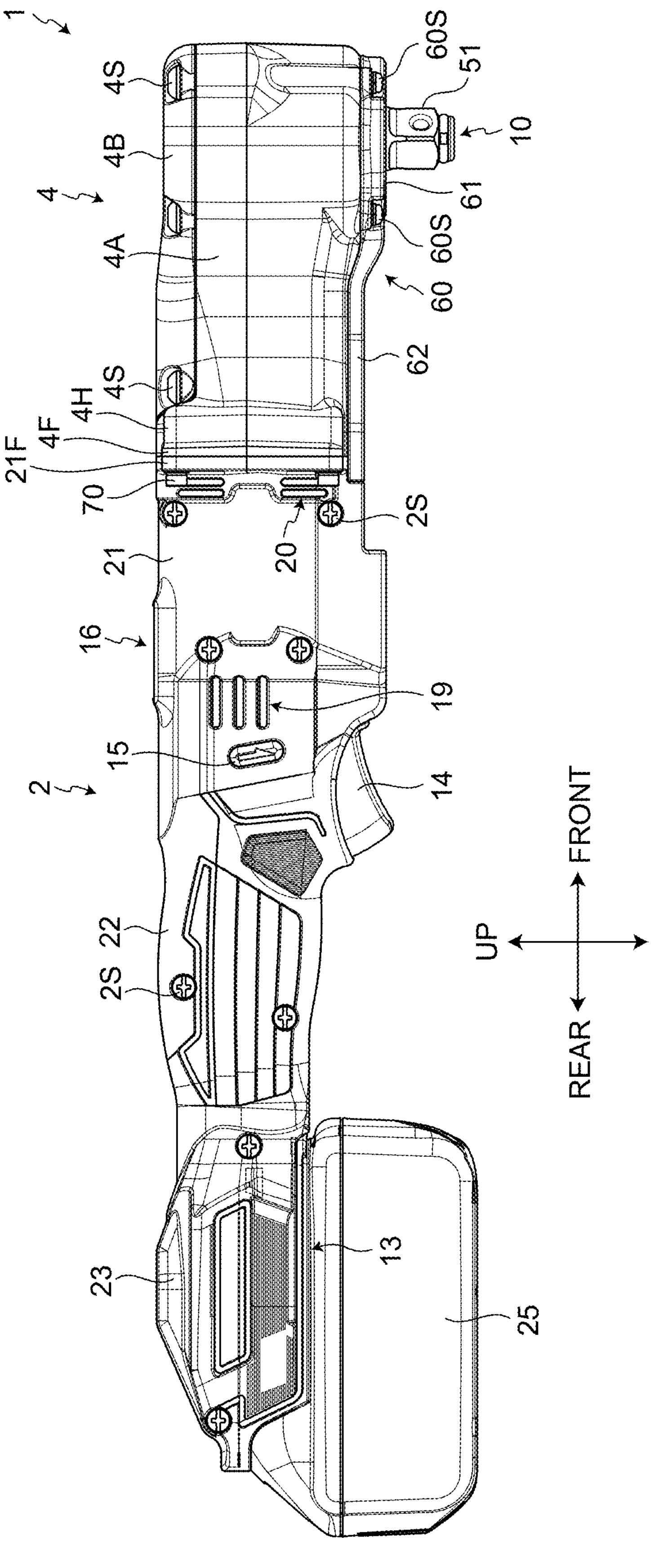
FIG. 2 is a side view illustrating the electric power tool according to the embodiment.
Figure 3:
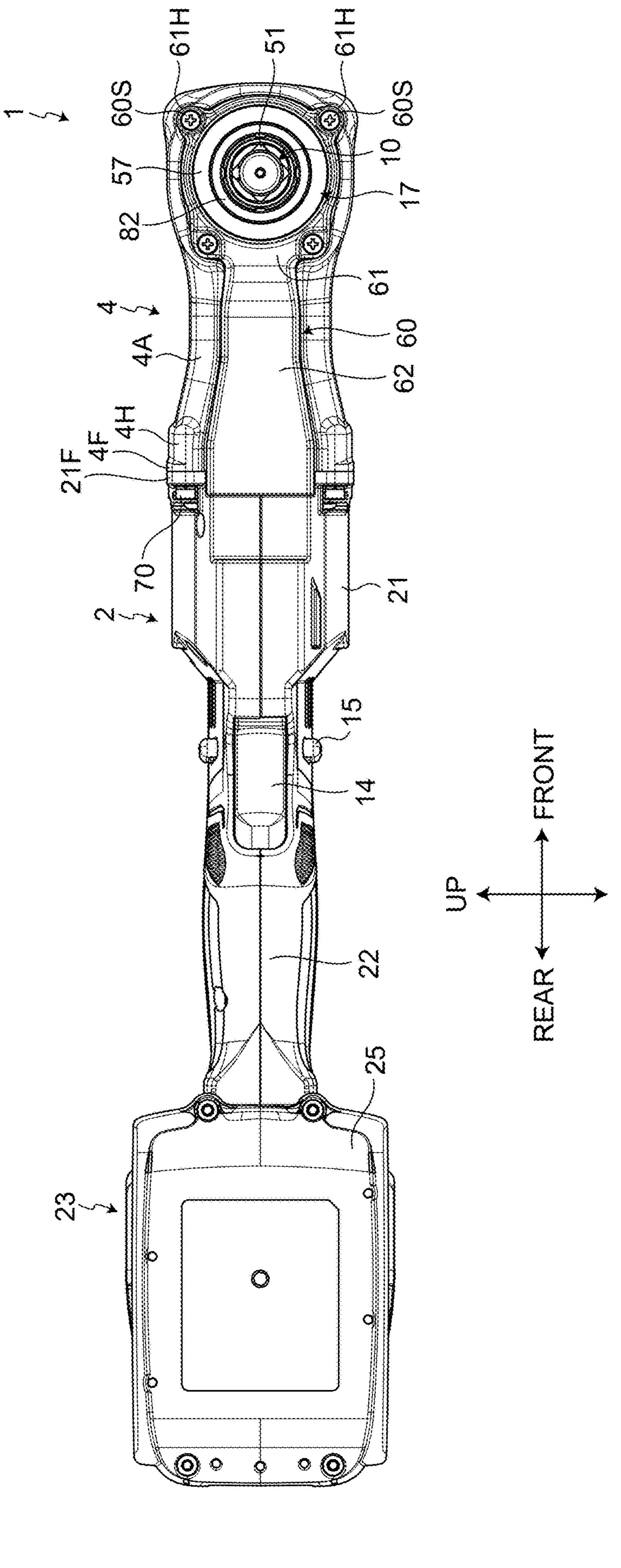
FIG. 3 is a bottom view illustrating the electric power tool according to the embodiment.
Figure 4:
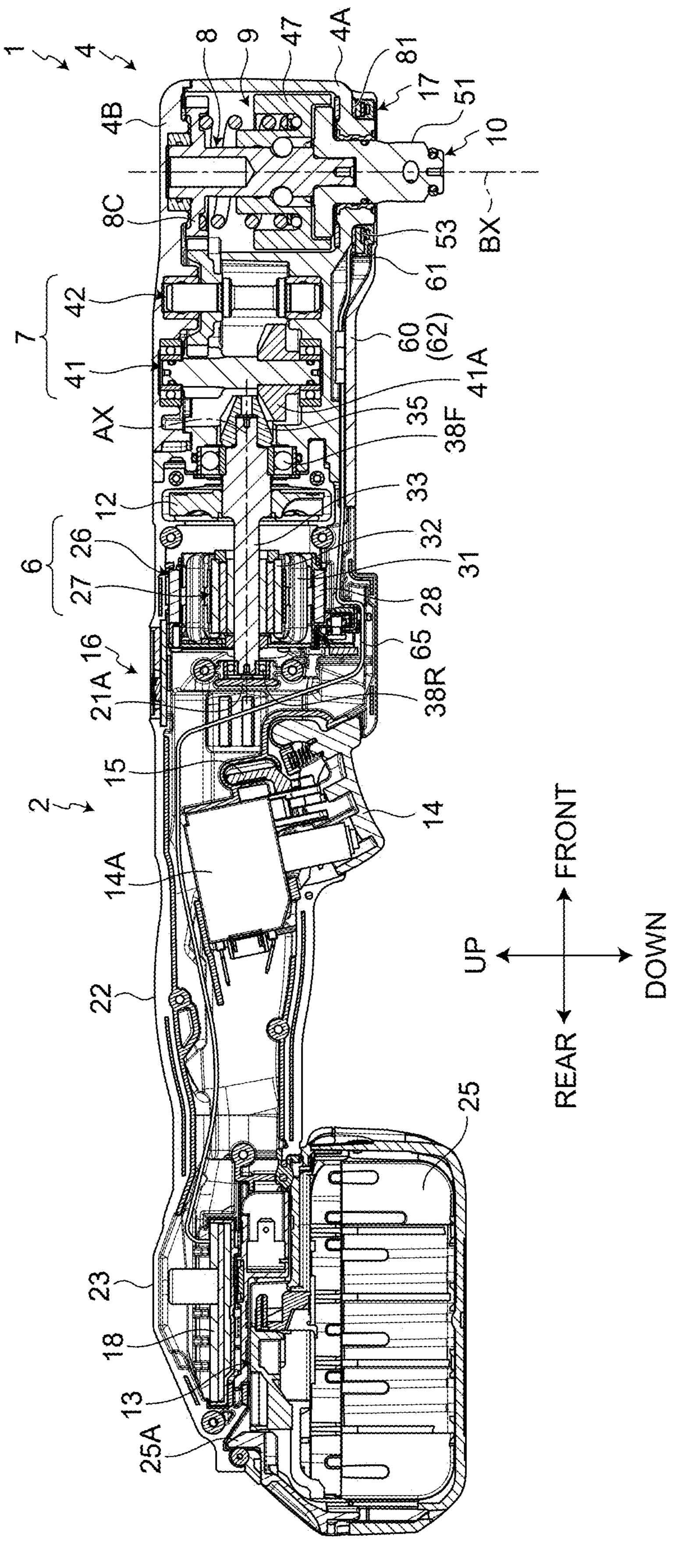
FIG. 4 is a longitudinal sectional view illustrating the electric power tool according to the embodiment.
Figure 5:
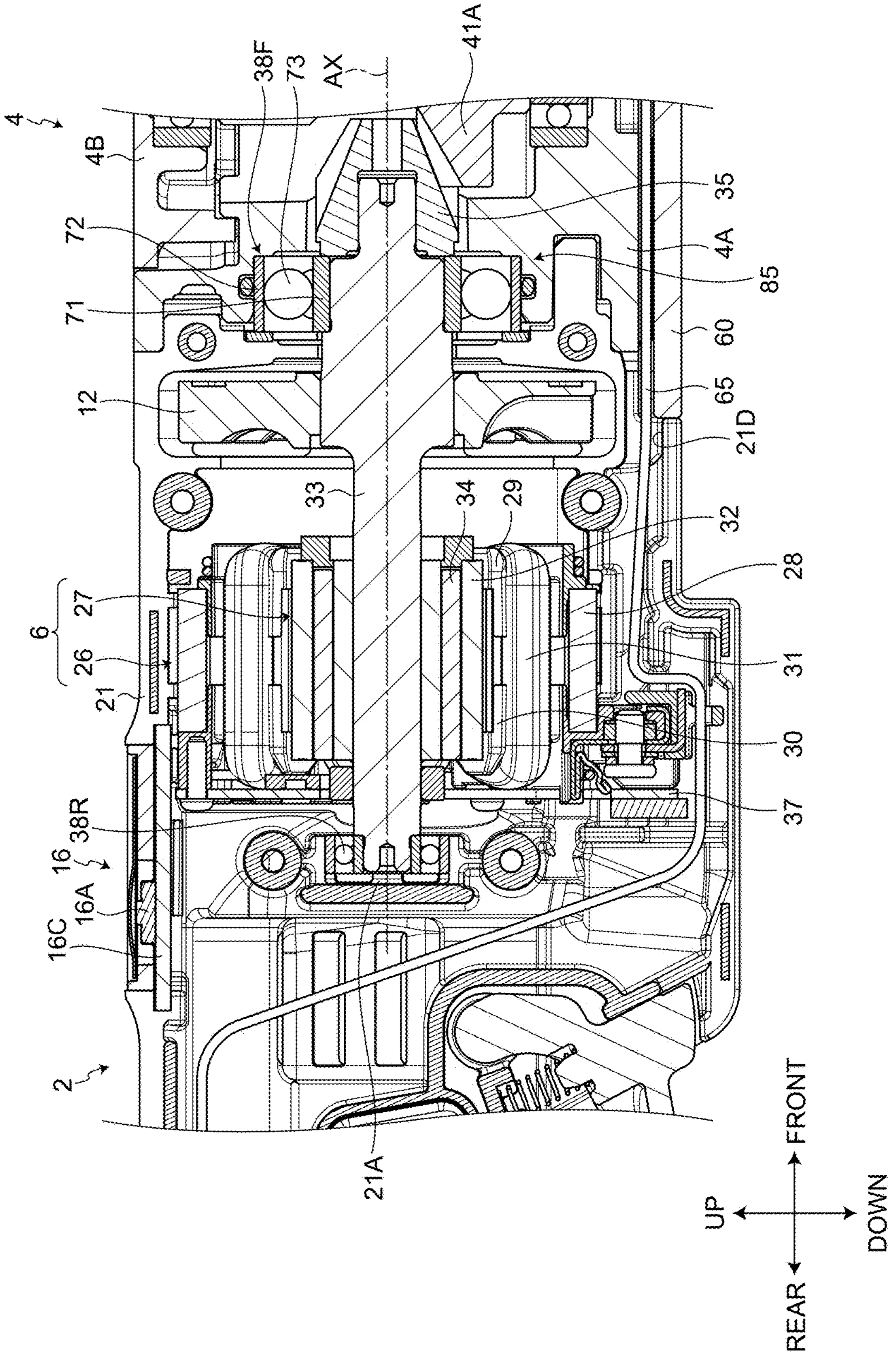
FIG. 5 is a longitudinal sectional view illustrating a motor housing of the electric power tool according to the embodiment.
Figure 6:
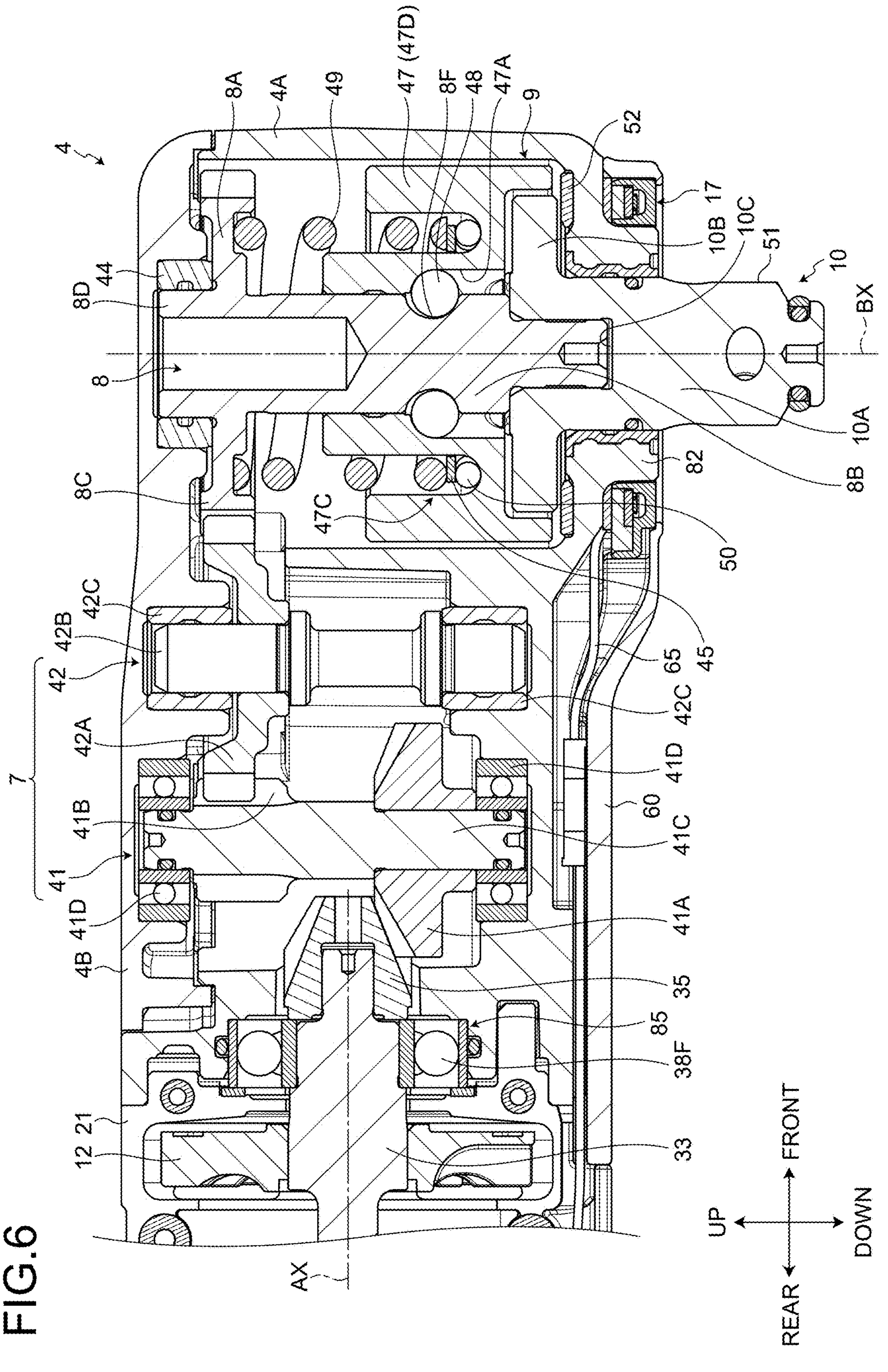
FIG. 6 is a longitudinal sectional view illustrating a case of the electric power tool according to the embodiment.
Figure 7:
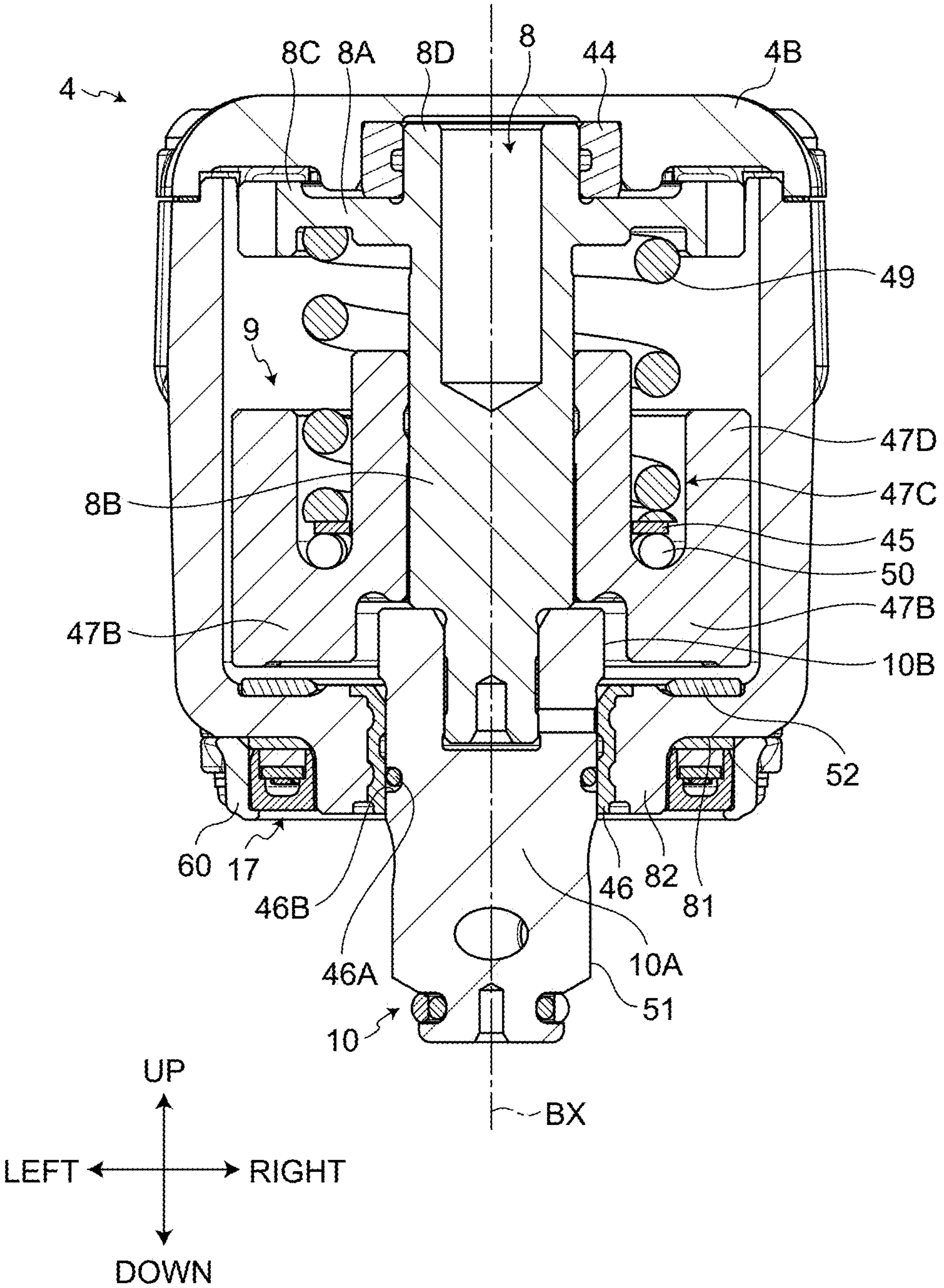
FIG. 7 is a left-right cross-sectional view of the electric power tool according to the embodiment along an anvil.

FIG. 1 is a perspective view illustrating an electric power tool 1 according to the embodiment. FIG. 2 is a side view illustrating the electric power tool 1 according to the embodiment. FIG. 3 is a bottom view illustrating the electric power tool 1 according to the embodiment. FIG. 4 is a longitudinal sectional view illustrating the electric power tool 1 according to the embodiment. FIG. 5 is a longitudinal sectional view illustrating a motor housing 21 of the electric power tool 1 according to the embodiment. FIG. 6 is a longitudinal sectional view illustrating a case 4 of the electric power tool 1 according to the embodiment. FIG. 7 is a left-right cross-sectional view of the electric power tool 1 according to the embodiment along an anvil 10.

In the embodiment, the electric power tool 1 is an electric power tool having a motor 6 being an electric motor, as a power source. The direction parallel to a rotation axis AX of the motor 6 is appropriately referred to as an axial direction, the direction around the rotation axis AX is appropriately referred to as a circumferential direction or a rotation direction, and a radiating direction of the rotation axis AX is appropriately referred to as a radial direction. In the radial direction, a position close to or a direction approaching the rotation axis AX is appropriately referred to as an inward or inner side in the radial direction or an inner circumferential side, and a position far from or a direction away from the rotation axis AX is appropriately referred to as an outward or outer side in the radial direction or an outer circumferential side. In the embodiment, the rotation axis AX extends in the front-rear direction. One side in the axial direction is a front side (front direction), and the other side in the axial direction is a rear side (rear direction).

In the embodiment, the electric power tool 1 is an angle impact wrench. The electric power tool 1 includes a housing 2, a case 4, a motor 6, a speed reducing mechanism 7, a spindle 8, an impacting mechanism 9, an anvil 10, a fan 12, a battery mounting unit 13, a trigger lever 14, a forward/reverse switching lever 15, an operation panel 16, a light unit 17, and a controller 18.

The housing 2 is formed of synthetic resin. The housing 2 includes a pair of left and right half-split housings. The pair of half-split housings is fixed by a plurality of screws 2S.

The housing 2 includes a motor housing 21, a grip 22, and a battery holder 23.

The motor housing 21 constitutes a front portion of the housing 2. The motor housing 21 is disposed forward of the grip 22. The motor housing 21 has a tubular shape. The motor housing 21 accommodates the motor 6. The motor housing 21 accommodates the motor 6, the fan 12, and a bearing 38R. The operation panel 16 is provided on the upper side of the motor housing 21.

The grip 22 extends in the front-rear direction. The grip 22 extends rearward from the motor housing 21. The trigger lever 14 is provided on the lower side of the grip 22. The grip 22 is gripped by an operator.

The battery holder 23 is connected to the rear end of the grip 22. The battery holder 23 accommodates the controller 18. The battery holder 23 holds a battery pack 25. The battery pack 25 is mounted on a battery mounting unit 13 located on a lower surface of the battery holder 23.

The motor housing 21 has intake ports 19 and exhaust ports 20. The intake ports 19 and the exhaust ports 20 are provided on the left and right side surfaces of the motor housing 21. The air in the external space of the housing 2 flows into the internal space of the housing 2 via the intake ports 19. The air in the internal space of the housing 2 flows out to the external space of the housing 2 via the exhaust ports 20.

The housing 2 and the case 4 are aligned in the front-rear direction. The motor housing 21 and the case 4 are connected to each other in the front-rear direction. The front portion of the housing 2 and the rear portion of the case 4 are connected to each other. The housing 2 and the case 4 are fixed by screws 70.

The case 4 is connected to the front portion of the motor housing 21. The motor housing 21 is fixed to the rear portion of the case 4. The motor housing 21 has, at its front end, a housing flange 21F. The case 4 has, at its rear end, a case flange 4F in which a plurality of bosses 4H is formed. The screws 70 pass through screw insertion holes of the housing flange 21F to be coupled to the bosses 4H, thereby fixing the case 4 and the motor housing 21 to each other.

The case 4 accommodates a bevel gear 35 which is a pinion gear. The case 4 accommodates the speed reducing mechanism 7. The case 4 accommodates the spindle 8. The case 4 accommodates the impacting mechanism 9 including a hammer 47. The case 4 accommodates a part of the anvil 10. The case 4 is formed of metal. In the embodiment, the case 4 is formed of aluminum. The case 4 is hollow and box-shaped.

The case 4 includes a case body 4A and a lid 4B. The case body 4A has a hollow box shape, and has its rear surface and an upper surface formed as openings. A rear surface of the case body 4A is connected to the motor housing 21 of the housing 2 and is covered by the motor housing 21. The upper surface of the case body 4A is covered with the lid 4B. The lid 4B is provided on a part of the upper surface of the case body 4A, specifically from the front end to the front side of the rear end of the upper surface, and is fixed to the case body 4A by screws 4S. The speed reducing mechanism 7, the spindle 8, the impacting mechanism 9, and the anvil 10 are assembled to the case 4 through the upper surface opening of the case body 4A. In this state, the lid 4B is mounted to the case body 4A to allow these portions to be accommodated in the case 4.

The case 4 has a front surface, left and right side surfaces, and a lower surface, which are configured with the case body 4A. As illustrated in FIG. 7, the lower surface of the case 4 has a placement surface 81 being a flat surface and a tubular portion 82 protruding downward from the placement surface 81. The placement surface 81 is a surface located in the front-rear direction and the left-right direction. The placement surface 81 connects the front surface and the left and right side surfaces of the case body 4A to the tubular portion 82. The light unit 17 and the light cover 60 are disposed on the placement surface 81. The placement surface 81 is covered with the light cover 60. The tubular portion 82 is located near the front surface of the lower surface of the case 4. The tubular portion 82 has a cylindrical shape. The inner opening of the tubular portion 82 communicates with the inside of the case 4. The anvil 10 passes through the tubular portion 82. The anvil 10 protrudes downward from the inside of the case 4 through the tubular portion 82.

The case 4 holds a bearing 38F that supports the rotor 27 of the motor 6 so as to be rotatable. The speed reducing mechanism 7 is disposed forward of the bearing 38F. The spindle 8 and the impacting mechanism 9 are disposed forward of the speed reducing mechanism 7. The anvil 10 is disposed downward of the impacting mechanism 9.

The motor 6 is a power source of the electric power tool 1. The motor 6 generates a rotational force. The motor 6 is an electric motor. The motor 6 is an inner rotor type brushless motor. The motor 6 is accommodated in the motor housing 21 of the housing 2. The motor 6 is disposed inside the motor housing 21.

As illustrated in FIG. 5, the motor 6 includes: a stator 26; and a rotor 27 rotatable with respect to the stator 26. The stator 26 is supported by the motor housing 21. At least a part of the rotor 27 is disposed inside the stator 26. The rotor 27 rotates with respect to the stator 26. The rotor 27 rotates about the rotation axis AX extending in the front-rear direction.

The stator 26 includes a stator core 28, a front insulator 29, a rear insulator 30, and coils 31.

The stator core 28 is disposed outside the rotor 27 in a radial direction. The stator core 28 includes a plurality of stacked steel plates. The steel plate is a metal plate containing iron as a main component. The stator core 28 has a tubular shape. The stator core 28 includes a plurality of teeth respectively supporting the coils 31.

The front insulator 29 is provided at the front portion of the stator core 28. The rear insulator 30 is provided at the rear portion of the stator core 28. The front insulator 29 and the rear insulator 30 are each an electric insulating member formed of synthetic resin. The front insulator 29 is disposed so as to cover a part of the surface of the teeth. The rear insulator 30 is disposed so as to cover a part of the surface of the teeth.

The coils 31 are mounted to the stator core 28 via the front insulator 29 and the rear insulator 30. The coils are wound on the respective teeth of the stator core 28 via the front insulator 29 and the rear insulator 30. The coils 31 and the stator core 28 are electrically insulated from each other by the front insulator 29 and the rear insulator 30.

The rotor 27 rotates about the rotation axis AX. The rotor 27 includes a rotor core 32, a rotor shaft 33, and a rotor magnet 34.

The rotor core 32 and the rotor shaft 33 are each formed of steel. In the embodiment, the rotor core 32 and the rotor shaft 33 are separate from each other. The rotor core 32 and the rotor shaft 33 may be integrally formed. The front portion of the rotor shaft 33 protrudes in the front direction from a front end surface of the rotor core 32. The rear portion of the rotor shaft 33 protrudes rearward from the rear end surface of the rotor core 32.

The rotor magnet 34 is fixed to the rotor core 32. The rotor magnet 34 extends in the front-rear direction so as to penetrate the rotor core 32.

There is provided a sensor substrate 37 attached to the rear insulator 30. The sensor substrate 37 includes: a circuit substrate having a hoop shape; and a magnetic sensor supported by the circuit substrate. At least a part of the sensor substrate 37 faces the rotor magnet 34. The magnetic sensor detects the position of the rotor magnet 34 to detect the position of the rotor 27 in the rotation direction.

The rotor shaft 33 extends from the motor housing 21 to the internal space of the case 4. The rear portion of the rotor shaft 33 is rotatably supported by the bearing 38R. The front portion of the bearing 38R is rotatably supported by the bearing 38F. The bearing 38R is held by the housing 2. The bearing 38R is accommodated in a rear holder 21A having a recessed shape and provided in the motor housing 21. The bearing 38F is accommodated in an accommodating recess 85 provided in the rear portion of the case 4. The front end of the rotor shaft 33 is disposed in the internal space of the case 4 through the opening in the front surface of the motor housing 21 and the opening in the rear portion of the case 4.

There is provided a bevel gear 35 at a front end of the rotor shaft 33. The bevel gear 35 is a pinion gear that rotates integrally with the rotor 27. The bevel gear 35 is connected to at least a part of the speed reducing mechanism 7. The rotor shaft 33 is coupled to the speed reducing mechanism 7 via the bevel gear 35.

As illustrated in FIG. 6, the speed reducing mechanism 7 is connected to the bevel gear 35 which is a pinion gear. The speed reducing mechanism 7 transmits the rotational force of the motor 6 to the spindle 8 and the anvil 10. The speed reducing mechanism 7 is accommodated in the case 4. The speed reducing mechanism 7 includes a plurality of gears. The speed reducing mechanism 7 is disposed forward of the motor 6. The speed reducing mechanism 7 is disposed forward of the accommodating recess 85. The speed reducing mechanism 7 couples the rotor shaft 33 and the spindle 8 to each other. The gears of the speed reducing mechanism 7 are driven by the rotor 27. The speed reducing mechanism 7 transmits the rotation of the rotor 27 to the spindle 8. The speed reducing mechanism 7 rotates the spindle 8 at a rotational speed lower than the rotational speed of the rotor shaft 33.

The speed reducing mechanism 7 includes a multiple-stage speed reducers. The speed reducing mechanism 7 includes a first speed reducer 41 and a second speed reducer

42. The first speed reducer 41 is connected to the pinion gear and rotates to decelerate the rotation of the pinion gear. The second speed reducer 42 decelerates the rotation of the first speed reducer 41 and transmits the rotation to the spindle 8.

The first speed reducer 41 includes a driven gear 41A, a first intermediate gear 41B, and a first intermediate shaft 41C. The first intermediate shaft 41C extends in a direction intersecting the rotation axis AX. The first intermediate shaft 41C extends in the up-down direction orthogonal to the rotation axis AX and rotates about the central axis in the up-down direction. Ends of the first intermediate shaft 41C are rotatably supported by intermediate bearings 41D. The intermediate bearings 41D are held by the case 4. The intermediate bearings 41D are ball bearings. The driven gear 41A and the first intermediate gear 41B are fixed to the first intermediate shaft 41C. In the present embodiment, the first intermediate gear 41B and the first intermediate shaft 41C are integrated to each other. The first intermediate gear 41B and the first intermediate shaft 41C may be separate from each other. The driven gear 41A is attached to a lower portion of the first intermediate shaft 41C, and the first intermediate gear 41B is attached to an upper portion of the first intermediate shaft 41C. The driven gear 41A, the first intermediate gear 41B, and the first intermediate shaft 41C rotate integrally. The driven gear 41A is a bevel gear that meshes with the bevel gear 35 being a pinion gear. The first intermediate gear 41B is a spur gear. The first intermediate gear 41B meshes with a second intermediate gear 42A of the second speed reducer 42.

The second speed reducer 42 is disposed forward of the first speed reducer 41. The second speed reducer 42 includes the second intermediate gear 42A and a second intermediate shaft 42B. The second intermediate shaft 42B extends in a direction intersecting the rotation axis AX. The second intermediate shaft 42B extends in the up-down direction orthogonal to the rotation axis AX and rotates about the central axis in the up-down direction. The first intermediate shaft 41C and the second intermediate shaft 42B are parallel to each other. Ends of the second intermediate shaft 42B are rotatably supported by intermediate bearings 42C. The intermediate bearings 42C are held by the case 4. The intermediate bearings 42C are sliding bearing. The second intermediate gear 42A is fixed to the second intermediate shaft 42B. The second intermediate gear 42A is attached to the upper portion of the second intermediate shaft 42B. The second intermediate gear 42A and the second intermediate shaft 42B rotate integrally. The second intermediate gear 42A is a spur gear. The second intermediate gear 42A meshes with the first intermediate gear 41B. The second intermediate gear 42A rotates to decelerate the rotation of the first intermediate gear 41B. The second intermediate gear 42A meshes with a spindle gear 8C of the spindle 8. The spindle gear 8C rotates integrally with the spindle 8. The spindle gear 8C is a spur gear. In this manner, the electric power tool 1 includes the intermediate shafts (the first intermediate shaft 41C and the second intermediate shaft 42B) disposed between the bevel gear 35 and the spindle 8 and configured to transmit the rotation of the bevel gear 35 to the spindle 8. The intermediate shafts (the first intermediate shaft 41C and the second intermediate shaft 42B) are accommodated in the case 4 and extend in a direction intersecting the front-rear direction.

The rotation of the rotor shaft 33 by the driving of the motor 6 rotates the bevel gear 35, and then, the bevel gear 35 rotates the driven gear 41A. Due to the rotation of the driven gear 41A, the first intermediate shaft 41C rotates at a rotational speed lower than the rotational speed of the rotor shaft 33. The rotation of the first intermediate shaft 41C rotates the first intermediate gear 41B, and then the first intermediate gear 41B rotates the second intermediate gear 42A. Due to the rotation of the second intermediate gear 42A, the second intermediate gear 42A rotates at a rotational speed lower than the rotational speed of the first intermediate shaft 41C. The second intermediate gear 42A rotates the spindle gear 8C. The spindle gear 8C rotates at a rotational speed lower than the rotational speed of the second intermediate gear 42A. The spindle 8 rotates with the rotation of the spindle gear 8C. The spindle 8 rotates at a rotational speed lower than the rotational speed of the rotor shaft 33.

The spindle 8 is connected to the speed reducing mechanism 7. The spindle 8 is rotated by the motor 6. The spindle 8 is disposed forward of the motor 6. The spindle 8 is disposed forward of the stator 26. The spindle 8 is disposed forward of the rotor 27. At least a part of the spindle 8 is disposed forward of the speed reducing mechanism 7. The spindle 8 is rotated by the rotor 27. The spindle 8 rotates by the rotational force of the rotor 27 transmitted by the speed reducing mechanism 7.

The spindle 8 extends in a direction intersecting the front-rear direction. The spindle 8 extends downward along a rotation axis BX orthogonal to the front-rear direction. The spindle 8 rotates about the rotation axis BX. The rotation axis BX of the spindle 8 and the rotation axis AX of the motor 6 are not parallel and intersect with each other. The direction of the rotation axis BX of the spindle 8 may intersect the front-rear direction (that is, the rotation axis AX) at any angle of 80 degrees or more and 100 degrees or less. In the embodiment, the spindle 8, the hammer 47, and the anvil 10 are disposed along the rotation axis BX and rotate about the rotation axis BX.

The spindle 8 includes: a flange 8A; and a spindle shaft 8B protruding downward from the flange 8A. The spindle gear 8C is provided on the outer periphery of the flange 8A.

The spindle 8 is rotatably supported by a spindle bearing 44. The spindle bearing 44 is held by the case 4. The spindle 8 has a cylindrical portion 8D protruding upward from an upper portion of the flange 8A. The spindle bearing 44 is disposed on the outer periphery of the cylindrical portion 8D. The spindle bearing 44 supports the outer periphery of the cylindrical portion 8D to be rotatable. The spindle bearing 44 is a sliding bearing. The spindle shaft 8B has, at its lower end, a projection having a cylindrical shape and protruding downward. The projection is disposed in an anvil recess 10C formed on the upper surface of the anvil 10. The lower portion of the spindle 8 is rotatably supported by an anvil bearing 46 via the anvil 10.

The impacting mechanism 9 is driven by the motor 6. The rotational force of the motor 6 is transmitted to the impacting mechanism 9 via the speed reducing mechanism 7 and the spindle 8. The impacting mechanism 9 impacts the anvil 10 in the rotation direction based on the rotational force of the spindle 8 rotated by the motor 6. As illustrated in FIGS. 6 and 7, the impacting mechanism 9 includes a hammer 47, balls 48, and a coil spring 49. The impacting mechanism 9 including the hammer 47 is accommodated in the case 4. The impacting mechanism 9 is disposed between the spindle 8 and the anvil 10 in the case 4. The impacting mechanism 9 is disposed downward of the flange 8A of the spindle 8.

The hammer 47 is disposed forward of the speed reducing mechanism 7. The hammer 47 is accommodated in the case 4. The hammer 47 is rotated by the spindle 8. The hammer 47 is disposed around the spindle shaft 8B. The hammer 47 is held by the spindle shaft 8B. The balls 48 are disposed between the spindle shaft 8B and the hammer 47. The coil spring 49 is supported by the flange 8A and the hammer 47.

The hammer 47 includes a body 47D, a hammer groove 47A, and hammer projections 47B (refer to FIG. 7). The body 47D is disposed around the spindle shaft 8B. The body 47D has a hoop shape. The body 47D includes, at its rear portion, a recess 47C. The recess 47C is provided so as to be recessed in the front direction from the rear end of the body 47D. The recess 47C has a ring shape. The hammer projection portions 47B protrude in the front direction from the body 47D. The number of hammer projection portions 47B provided is two.

The hammer 47 is rotated by the motor 6. The rotational force of the motor 6 is transmitted to the hammer 47 via the speed reducing mechanism 7 and the spindle 8. The hammer 47 is rotatable together with the spindle 8 based on the rotational force of the spindle 8 rotated by the motor 6. The rotation axis of the hammer 47 coincides with the rotation axis BX of the spindle 8. The hammer 47 rotates about the rotation axis BX.

The balls 48 are formed of metal such as steel. The balls 48 are disposed between the spindle shaft 8B and the hammer 47. The spindle 8 has spindle grooves 8F. At least a part of each of the balls 48 is disposed in the corresponding spindle groove 8F. Each of the spindle grooves 8F is provided in a part of the outer peripheral surface of the spindle shaft 8B. The hammer 47 has hammer grooves 47A. At least a part of each of the balls 48 is disposed in the corresponding hammer grooves 47A. Each of the hammer grooves 47A is provided in a part of the inner surface of the body 47D. The balls 48 is disposed between the spindle grooves 8F and the hammer grooves 47A. The balls 48 can roll inside the spindle grooves 8F and inside the hammer grooves 47A. The hammer 47 is movable as the balls 48 move. The spindle 8 and the hammer 47 can move relative to each other in both the axial direction and the rotation direction within a movable range defined by the spindle grooves 8F and the hammer grooves 47A.

The coil spring 49 generates an elastic force of moving the hammer 47 downward. The coil spring 49 is disposed between the flange 8A and the hammer 47. The lower portion of the coil spring 49 is disposed in the ring-shaped recess 47C provided on the rear surface of the hammer 47. There is provided a washer 45 inside the recess 47C. The washer 45 is supported by the body 47D via balls 50. The upper end of the coil spring 49 is supported by the flange 8A. The lower end of the coil spring 49 is supported by the washer 45. Due to the interposition of the washer 45 and the ball 50, the hammer 47 and the coil spring 49 are relatively rotatable about the rotation axis BX.

The anvil 10 is an output portion of the electric power tool 1. The anvil 10 is rotated by the rotational force of the motor 6. At least a part of the anvil 10 is disposed downward of the hammer 47. The anvil 10 is directly or indirectly impacted in the rotation direction by the hammer 47. In the embodiment, the anvil 10 is directly impacted by the hammer 47.

The anvil 10 includes an anvil shaft 10A having a rod shape and anvil projections 10B. At the upper end of the anvil 10, there is provided an anvil recess 10C that receives the projection of the spindle shaft 8B. The anvil projections 10B are provided at the upper end of the anvil 10. The anvil projections 10B protrude outward in the radial direction from the upper end of the anvil shaft 10A. The anvil shaft 10A passes through the tubular portion 82 from the inside of the case 4 and protrudes downward to the outside of the case 4. A lower end of the anvil shaft 10A is exposed to the outside of the case 4. There is disposed a tool accessory holder 51 at the lower end of the anvil 10. The tool accessory holder 51 is provided at an exposed portion of the lower end of the anvil shaft 10A. The tool accessory holder 51 is rotated by the spindle 8. In the embodiment, the hammer 47 rotated by the spindle 8 impacts the anvil 10 in the rotation direction, allowing the tool accessory holder 51 to be rotated integrally with the anvil 10.

In the impact wrench according to the embodiment, the tool accessory holder 51 is an engaging portion having a quadrangular prism shape, and engages with an engaging recess of a socket being a tool accessory. The socket is held in a state of being fitted to the tool accessory holder 51.

The anvil 10 is rotatably supported by the anvil bearing 46 (refer to FIG. 7). The rotation axis of the anvil 10 coincides with the rotation axis BX of the spindle 8. The anvil 10 rotates about the rotation axis BX. The anvil bearing 46 is disposed inside the tubular portion 82. The anvil bearing 46 is disposed inside the tubular portion 82 of the case 4. The anvil bearing 46 is held by the tubular portion 82. The tubular portion 82 is disposed around the anvil shaft 10A. The anvil bearing 46 supports the anvil shaft 10A to be rotatable. In the embodiment, the anvil bearing 46 is a sliding bearing. The anvil shaft 10A is provided with a groove 46A having a ring shape and facing the anvil bearing 46. There is provided a seal member 46B having a ring shape in the groove 46A. There is provided a washer 52 on the inner bottom surface of the case 4. The washer 52 faces the anvil projections 10B.

The hammer projections 47B can come in contact with the anvil projections 10B. When the motor 6 rotates in a state where the hammer projections 47B and the anvil projections 10B are in contact with each other, the anvil 10 rotates together with the hammer 47 and the spindle 8.

The anvil 10 is impacted in the rotation direction by the hammer 47. For example, when the load acting on the anvil 10 becomes high during the screwing work, the anvil 10 can no longer be caused to be rotated only by the power generated by the motor 6. When the anvil 10 can no longer be caused to rotate only by the power generated by the motor 6, the rotation of the anvil 10 and the hammer 47 temporarily stops. The spindle 8 and the hammer 47 can move relative to each other in the axial direction and the circumferential direction via the balls 48. That is, even though the rotation of the hammer 47 temporarily stops, the spindle 8 continues to be rotated by the power generated by the motor 6. In a state where the rotation of the hammer 47 has temporarily stopped but the spindle 8 continues to be rotated, the balls 48 are caused to move upward while being guided by the spindle grooves 8F and the hammer grooves 47A. The hammer 47 receives a force from the balls 48 and thereby moves upward along with the balls 48. That is, in a state where the rotation of the anvil 10 has temporarily stopped, the hammer 47 moves upward owing to the rotation of the spindle 8. When the hammer 47 moves upward, the contact between the hammer projections 47B and the anvil projections 10B is released.

The coil spring 49 constantly generates an elastic force of moving the hammer 47 downward. The hammer 47 that has moved upward is then moved downward by the elastic force of the coil spring 49. When moving downward, the hammer 47 receives a force in the rotation direction from the balls 48. That is, the hammer 47 moves downward while rotating. When the hammer 47 moves downward while rotating, the hammer projections 47B comes into contact with the anvil projections 10B while rotating. This allows the anvil projections 10B to be impacted in the rotation direction by the hammer projections 47B. The motive power of the motor 6 and the inertial force of the hammer 47 both act on the anvil 10 at this time. Accordingly, the anvil 10 can be rotated about the rotation axis BX with higher torque.

The fan 12 is rotated by the rotational force of the motor 6. As illustrated in FIG. 5, the fan 12 is disposed forward of the stator 26 of the motor 6. The fan 12 generates an air flow for cooling the motor 6. The fan 12 is fixed to at least a part of the rotor 27. The fan 12 is fixed to the front portion of the rotor shaft 33. The fan 12 is disposed between the bearing 38F and the stator 26. The fan 12 is rotated by the rotation of the rotor 27. When the rotor shaft 33 rotates, the fan 12 rotates together with the rotor shaft 33. When the fan 12 rotates, the air in the external space of the housing 2 flows into the internal space of the housing 2 via the intake ports 19. The air flowing into the internal space of the housing 2 flows through the internal space of the housing 2 to cool the motor 6. When the fan 12 rotates, the air flowing through the internal space of the housing 2 flows out to the external space of the housing 2 via the exhaust ports 20.

As illustrated in FIGS. 1 and 5, the operation panel 16 is provided in the motor housing 21. The operation panel 16 is exposed to the outside through a panel opening 21B formed in the upper surface of the motor housing 21. The operation panel 16 is disposed near a boundary with the grip 22 at the rear of the motor housing 21. The operation panel 16 is disposed forward of the trigger lever 14. At least a part of the operation panel 16 overlaps with the motor 6 in the up-down direction. At least a part of the operation panel 16 overlaps with the bearing 38R in the up-down direction.

Figure 8:
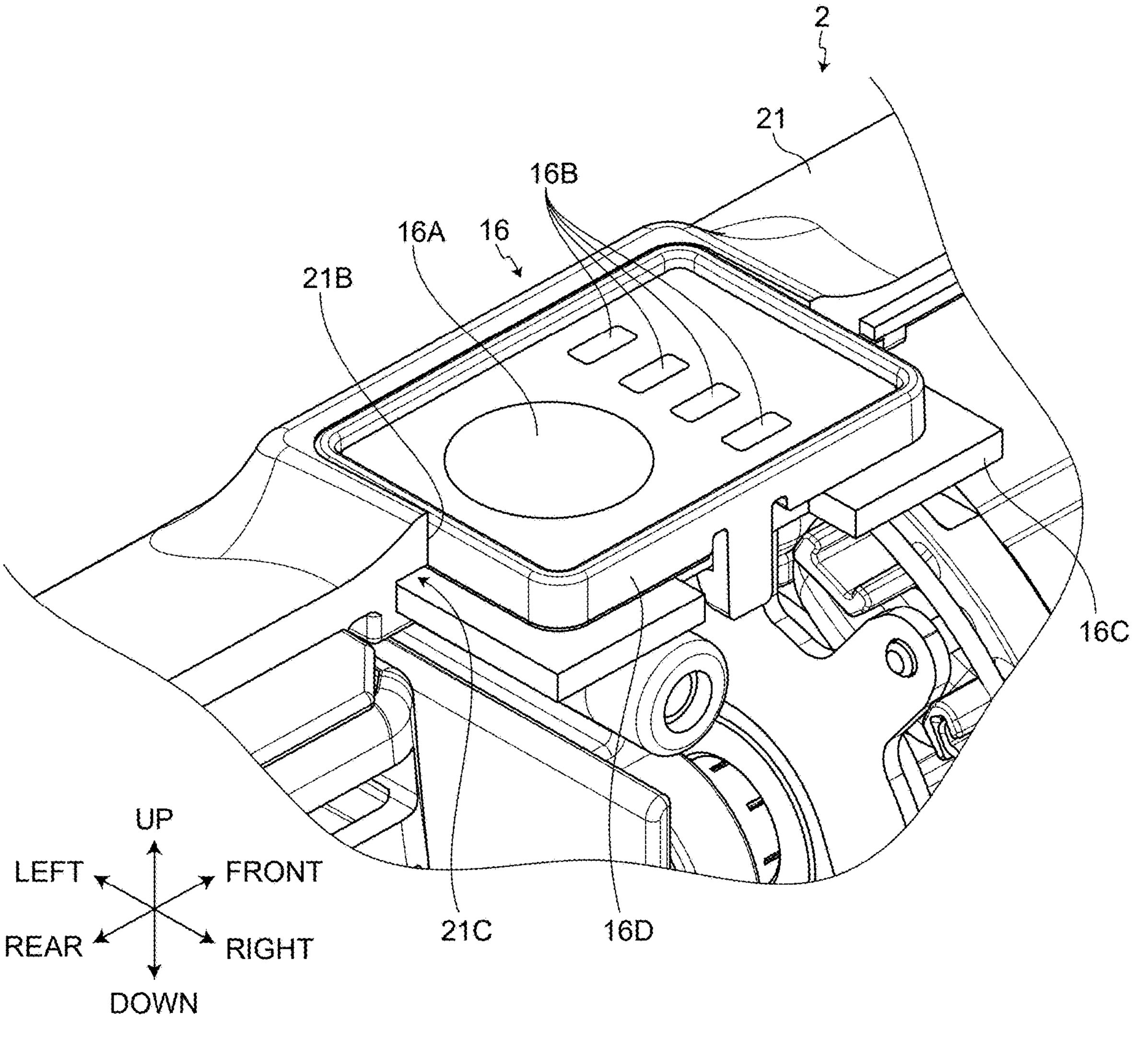
FIG. 8 is a perspective view illustrating an operation panel according to the embodiment.

FIG. 8 is a perspective view illustrating the operation panel 16 according to the embodiment. FIG. 8 illustrates a state in which a part of the operation panel 16 is exposed by removing the right side part of the housing 2. The operation panel 16 has a plate shape. The operation panel 16 includes an operation button 16A, an indicator display 16B, and a circuit substrate 16C. The operation button 16A and the indicator display 16B are fixed to the circuit substrate 16C via a bracket 16D having a frame shape. The bracket 16D is fitted into the panel opening 21B. The circuit substrate 16C includes the operation button 16A and the indicator display 16B, and is connected to the controller 18 by wiring. At a position immediately below the panel opening 21B, the motor housing 21 includes a holding groove 21C that supports the outer periphery of the circuit substrate 16C. With the outer periphery of the circuit substrate 16C fitted into the holding groove 21C, the operation panel 16 is held by the motor housing 21. The operation panel 16 outputs a signal corresponding to the input on the operation button 16A to the controller 18, and displays information by the indicator display 16B according to the signal from the controller 18.

When the operator operates the operation button 16A, the controller 18 switches the operation mode of the motor 6. The indicator display 16B has a light emitting element. The light emitting element is, for example, an LED light emitting element. The indicator display 16B displays the operation mode of the motor 6 by changing the lighting patterns of the plurality of light emitting elements. Examples of the operation modes include: operation modes of strong, medium, and weak operation modes individually indicating, for example, three stages of rotational speed setting of the motor 6; a mode of stopping the motor 6 based on the detection of start of impacting by the impacting mechanism 9; and a mode of switching the motor 6 to stop or low speed rotation based on the detection of rotation of the nut when loosening the nut.

Figure 9:
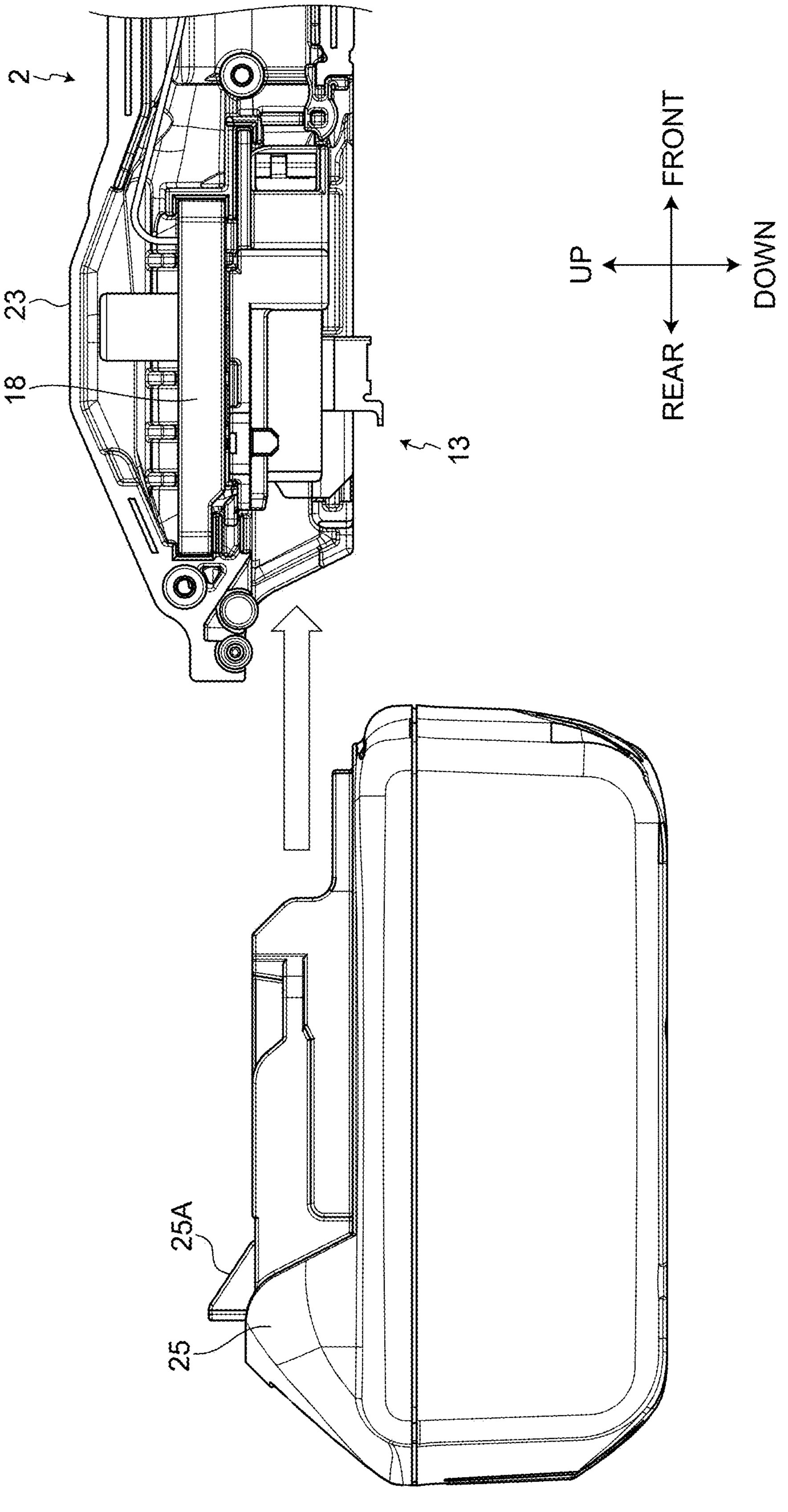
FIG. 9 is a schematic view illustrating mounting of a battery pack to a battery holder according to the embodiment.

FIG. 9 is a schematic view illustrating mounting of the battery pack 25 to the battery holder 23 according to the embodiment. FIG. 9 illustrates a state in which the right side part of the housing 2 is removed to expose the inside of the battery holder 23. As illustrated in FIGS. 4 and 9, the battery mounting unit 13 is disposed on the lower side of the battery holder 23. The battery pack 25 is mounted on the battery mounting unit 13. The battery pack 25 is detachable from the battery mounting unit 13. The battery mounting unit 13 holds the battery pack 25 slidably in the front-rear direction. When the battery pack 25 is slid forward from the rear of the battery mounting unit 13 and reaches an engagement position, the battery mounting unit 13 is engaged with an engagement hook 25A of the battery pack 25 to regulate a rearward sliding movement of the battery pack 25. The battery pack 25 has a release button for vertically advancing and retracting the engagement hook 25A. When the release button is pressed, the engagement hook 25A is retracted downward to release the engagement state with the battery mounting unit 13. This enables attachment and detachment of the battery pack 25.

The battery pack 25 functions as a power source of the electric power tool 1. The battery pack 25 includes a secondary battery. In the embodiment, the battery pack 25 includes a rechargeable lithium-ion battery. By being mounted onto the battery mounting unit 13, the battery pack 25 can supply power to the electric power tool 1. The motor 6 and the light unit 17 are each driven on the electric power supplied from the battery pack 25.

The controller 18 is driven on the power supplied from the battery pack 25.

The controller 18 outputs a control signal of controlling the motor 6. The controller 18 includes a circuit substrate equipped with a plurality of electronic components. Examples of the electronic components mounted on the circuit substrate include a processor such as a central processing unit (CPU), nonvolatile memory such as read only memory (ROM) or storage, volatile memory such as random access memory (RAM), a field effect transistor (FET), and a resistor. The controller 18 sets the operation mode of the electric power tool 1 based on the operation of the operation panel 16. The setting parameters of the operation mode of the electric power tool 1 include a current threshold of the motor 6, an on/off control condition, and the like. The controller 18 outputs a signal for displaying the setting state of the operation mode to the operation panel 16.

The controller 18 is accommodated in the battery holder 23. The controller 18 is disposed on the upper side of the battery mounting unit 13. The controller 18 extends in the front-rear direction and the left-right direction. The controller 18 is disposed so as to overlap the upper surface of the battery mounting unit 13. The battery holder 23 has a dome-shaped outer shape forming an accommodating space for the controller 18.

As illustrated in FIG. 4, the trigger lever 14 is provided on the grip 22. The trigger lever 14 is operated by an operator to start the motor 6. There is provided a switch body 14A on the upper side of the trigger lever 14. The switch body 14A is disposed inside the grip 22. The switch body 14A is operated by operating the trigger lever 14. The switch body 14A is operated to generate a trigger signal. The controller 18 switches between driving and stopping of the motor 6 based on the trigger signal.

The forward/reverse switching lever 15 is provided in the grip 22. The forward/reverse switching lever 15 is disposed at an upper position of the trigger lever 14 on the left and right side surfaces of the grip 22. The forward/reverse switching lever 15 is operated by an operator. When the forward/reverse switching lever 15 is operated, the rotation direction of the motor 6 is switched from one of the forward rotation direction or the reverse rotation direction to the other. Switching the rotation direction of the motor 6 will switch the rotation direction of the spindle 8.

The light unit 17 emits illumination light. The light unit 17 illuminates the anvil 10 and the surroundings of the anvil 10 with illumination light. The light unit 17 includes one or a plurality of light emitters 53. The light unit 17 includes a chip-on-board light emitting diode (COB LED).

Light Unit

Figure 10:
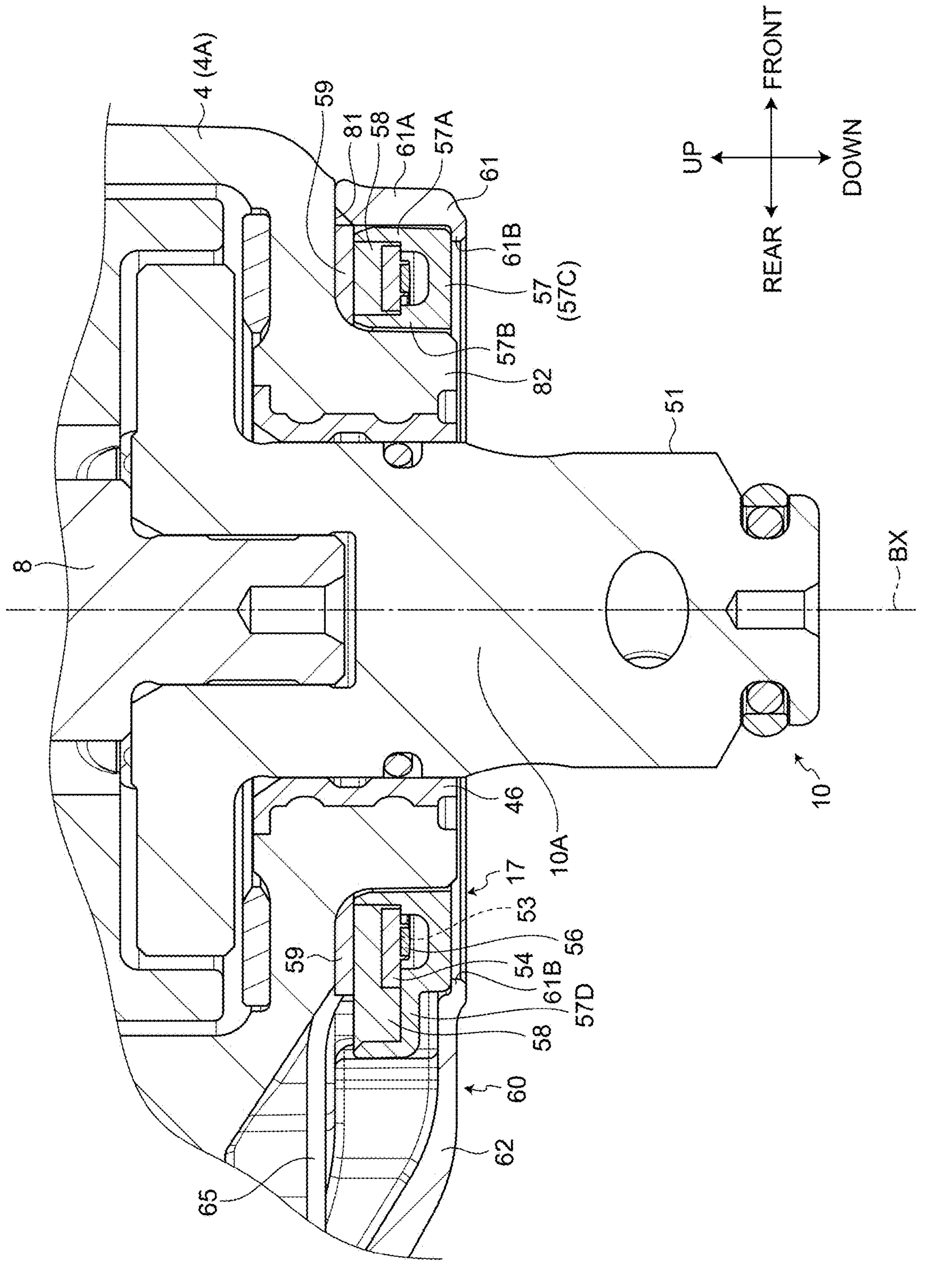
FIG. 10 is a front-rear direction longitudinal sectional view illustrating a light unit according to the embodiment.
Figure 11:
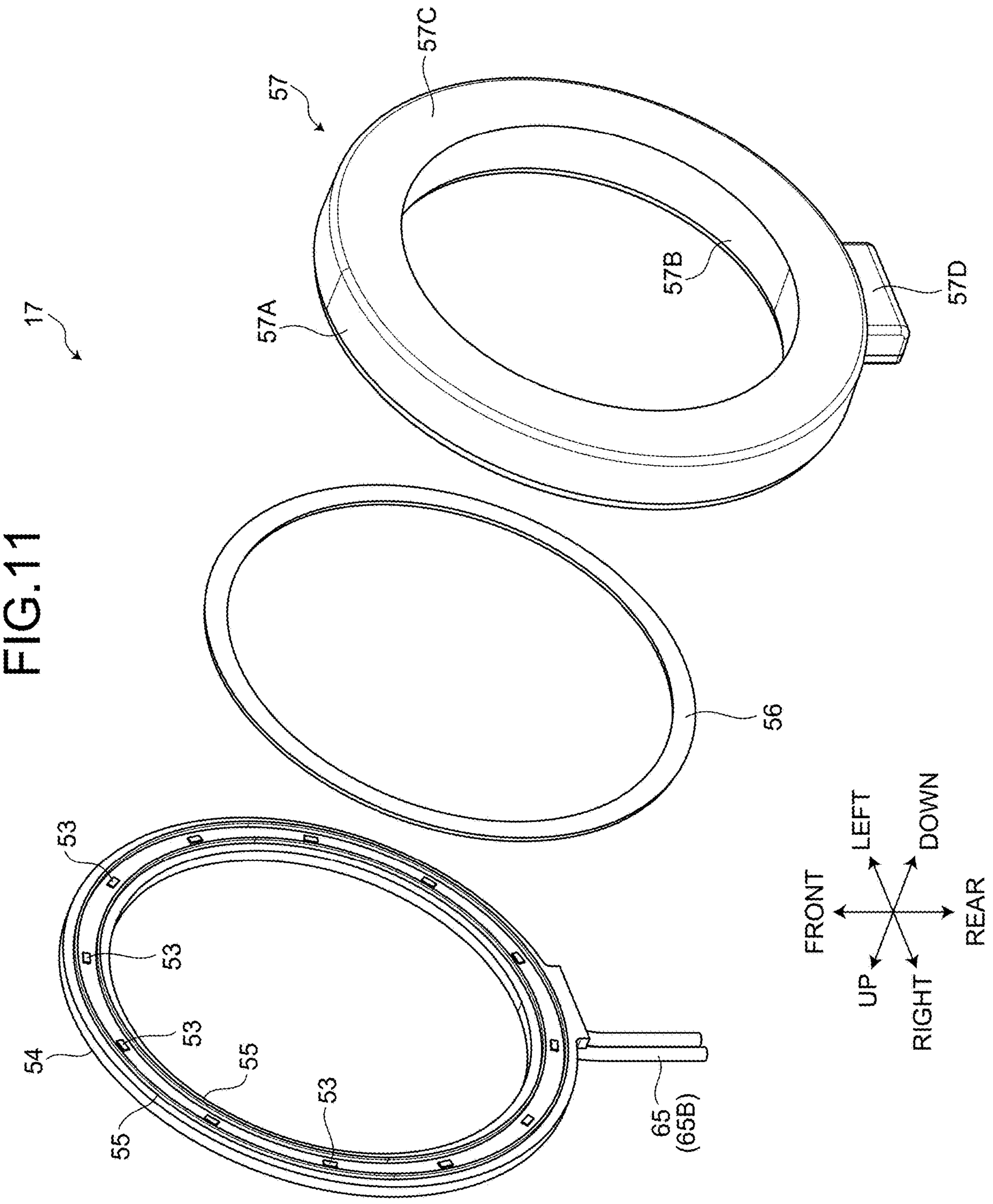
FIG. 11 is an exploded perspective view illustrating a structure of the light unit according to the embodiment.
Figure 12:
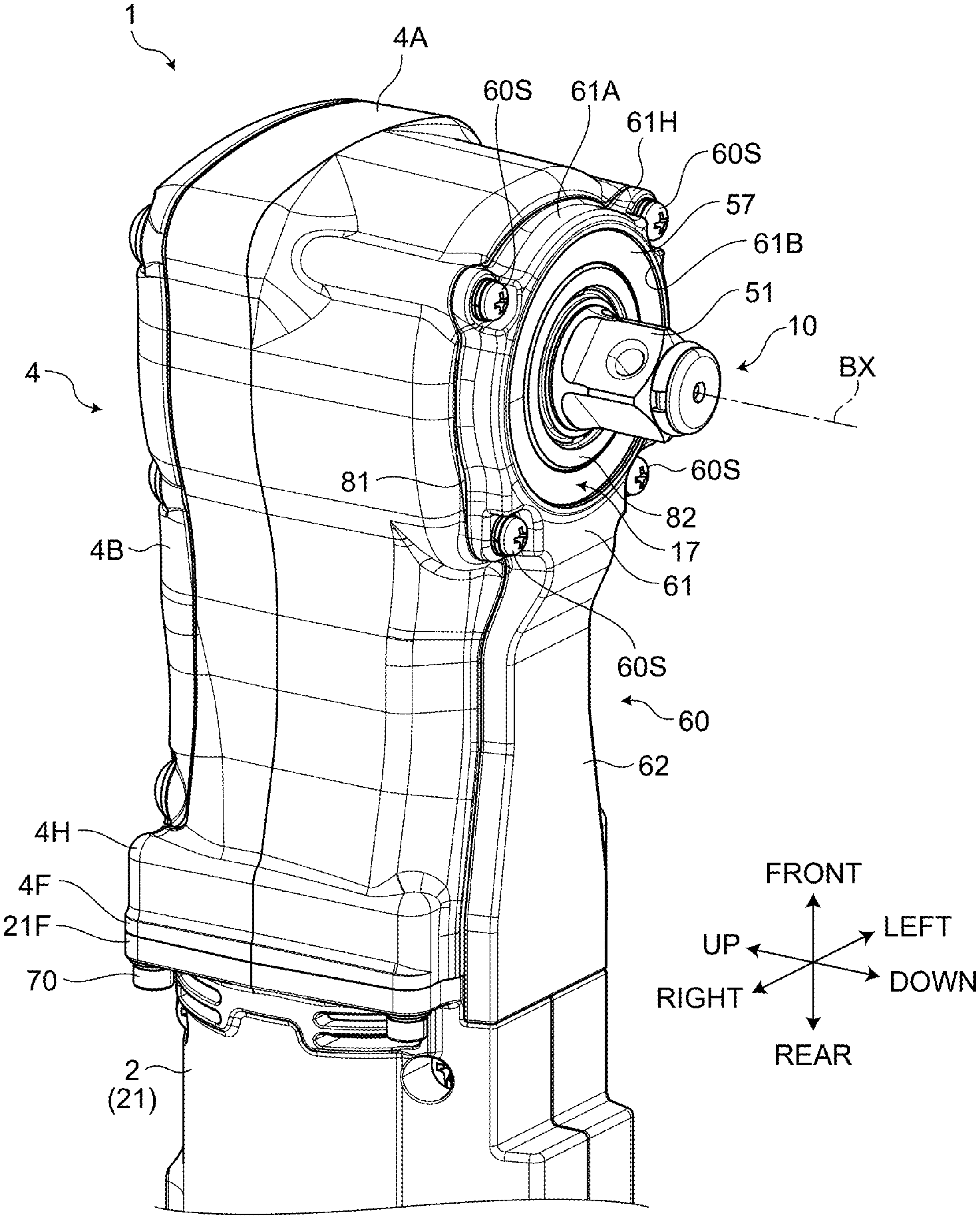
FIG. 12 is a lower perspective view illustrating a front portion of the electric power tool according to the embodiment.
Figure 13:
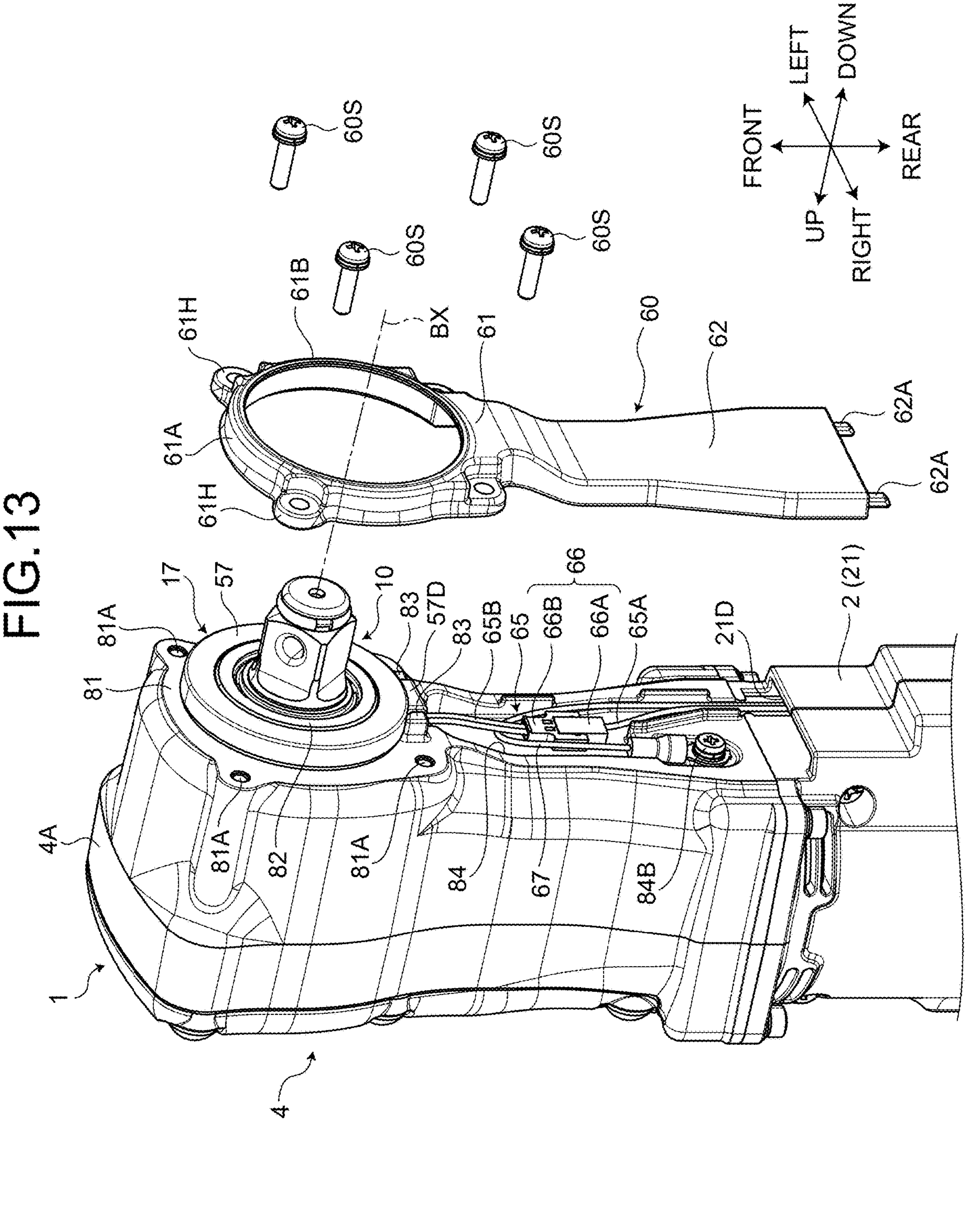
FIG. 13 is a lower exploded perspective view illustrating mounting of the light cover to a hammer case according to the embodiment.
Figure 14:
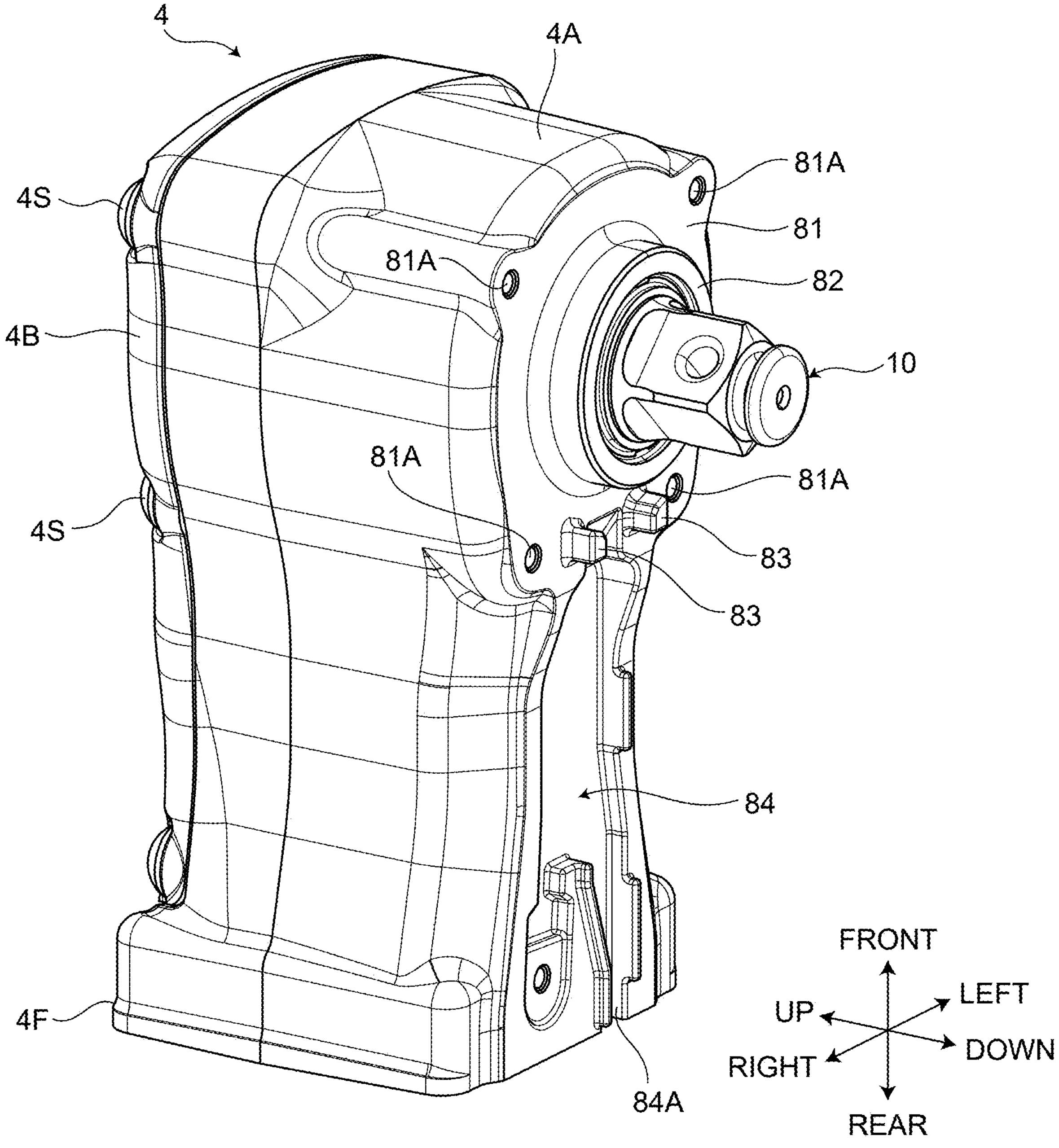
FIG. 14 is a lower perspective view illustrating the hammer case according to the embodiment.
Figure 15:
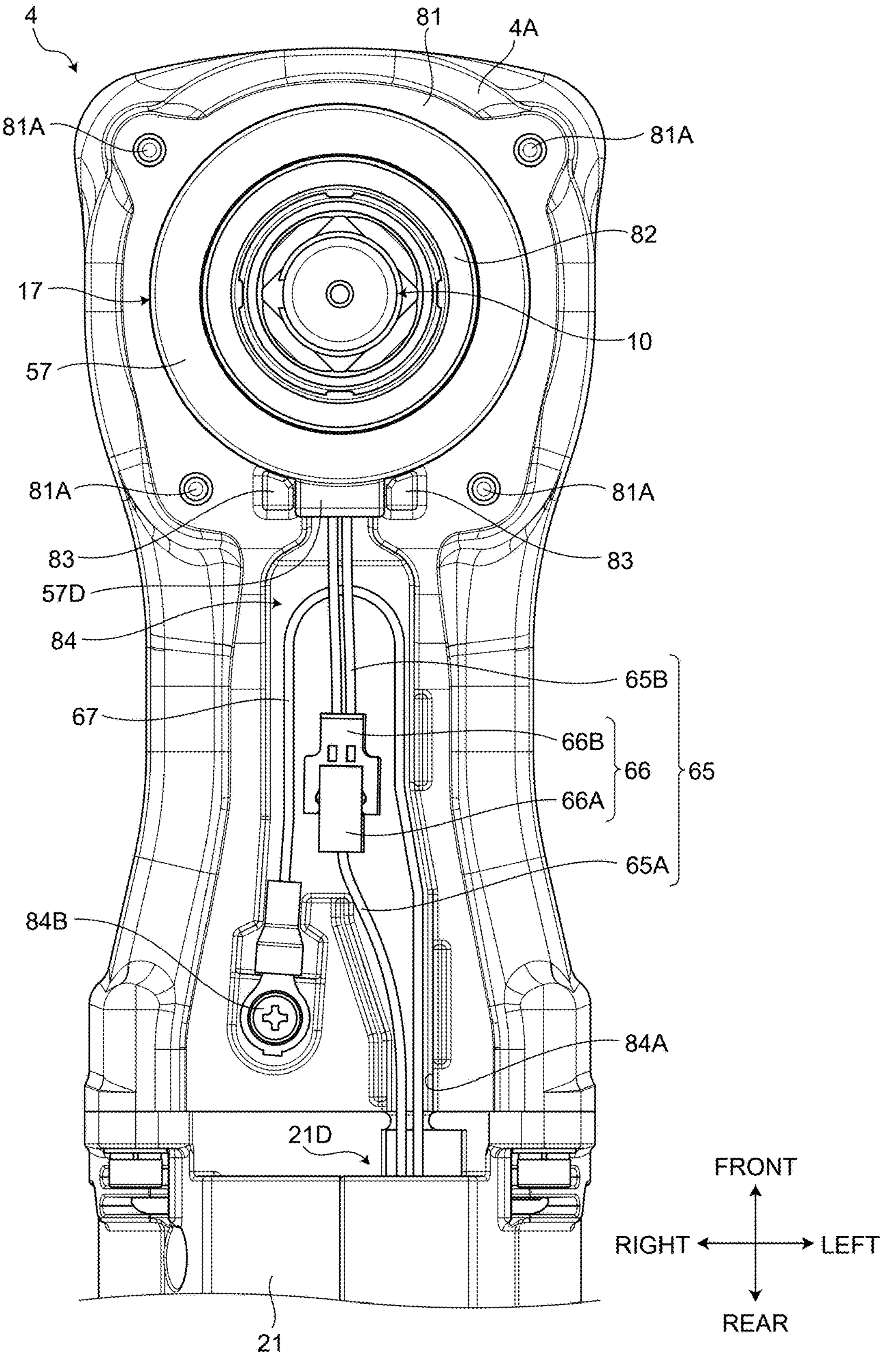
FIG. 15 is a bottom view of the hammer case with no light cover.
Figure 16:
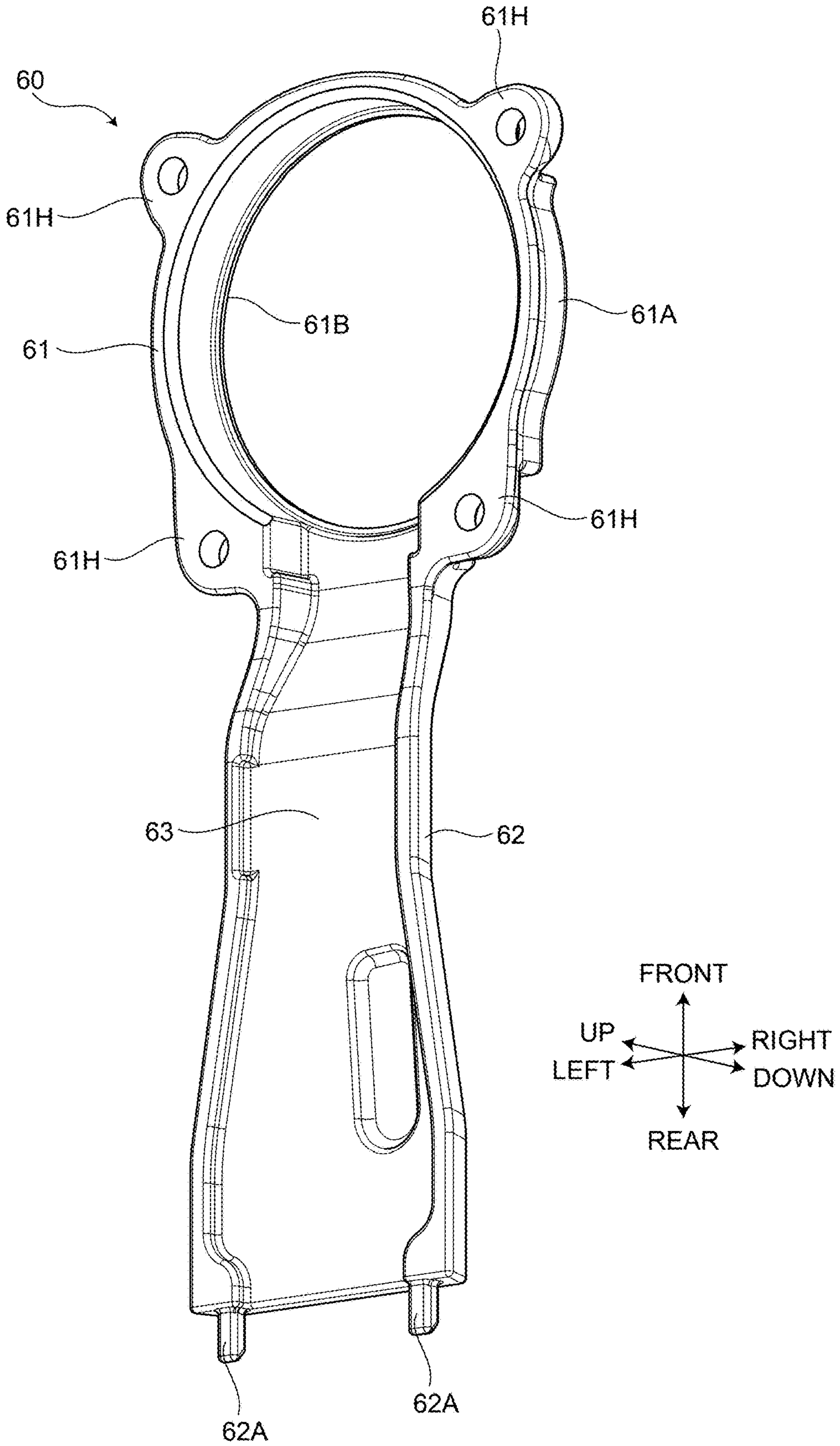
FIG. 16 is a perspective view illustrating a light cover.

FIG. 10 is a front-rear direction longitudinal sectional view illustrating the light unit 17 according to the embodiment. FIG. 11 is an exploded perspective view illustrating a structure of the light unit 17 according to the embodiment. FIG. 12 is a lower perspective view illustrating a front portion of the electric power tool 1 according to the embodiment. FIG. 13 is a lower exploded perspective view illustrating mounting of the light cover 60 to the hammer case according to the embodiment. FIG. 14 is a lower perspective view illustrating the hammer case according to the embodiment. FIG. 15 is a bottom view of the hammer case with no light cover. FIG. 16 is a perspective view illustrating the light cover.

The light unit 17 is disposed on the lower surface of the case 4. The light unit 17 is disposed around the tubular portion 82. The light unit 17 is disposed around the anvil 10 via the tubular portion 82. In the embodiment, the light unit 17 has a hoop shape surrounding the anvil 10.

The light unit 17 includes a plurality of light emitters 53. The light emitter 53 is a light emitting diode (LED) element. The light unit 17 includes a substrate 54 on which the plurality of light emitters 53 are mounted.

The light emitters 53 are held by the case 4. The light emitters 53 are held on a lower surface of the case 4. The light emitters 53 are provided around the anvil 10. The light emitters 53 are arrayed in the circumferential direction of the anvil 10. The light emitters 53 are disposed in a rotation direction around the anvil 10. The light emitters 53 are disposed at least partially around of the anvil shaft 10A. The light emitters 53 are arrayed in the rotation direction of the anvil 10. The light emitters 53 are mounted on a lower surface of the substrate 54.

Examples of the substrate 54 include an aluminum substrate, a glass cloth epoxy resin substrate (FR-4 substrate), and a composite epoxy resin substrate (CEM-3 substrate). The light emitters 53 are mounted on the front surface of the substrate 54. The light emitters 53 and the substrate 54 are connected via a gold wire (not illustrated). The gold wire connects the light emitters 53 to each other. The light emitters 53 are surrounded by a bank 55. There is provided a phosphor 56 is disposed in a partitioned space surrounded by the bank 55. The light emitters 53 are covered by the phosphor 56. A pair of electrodes (not illustrated) is disposed on the front-side surface (front surface) or the back surface (rear surface) of the substrate 54 outside the bank. One of the electrodes is a positive electrode, and the other electrode is a negative electrode. Each of the electrodes is connected with lead wires 65. The electric power output from the battery pack 25 is supplied to the electrode via the lead wires 65. The electric power supplied to the electrode is supplied to the light emitters 53 via the substrate 54 and the gold wire. The light emitters 53 emit light based on the electric power supplied from the battery pack 25. The light unit 17 and the controller 18 are connected to each other via the lead wires 65.

The substrate 54 has an annular shape surrounding the circumference of the tubular portion 82. The light emitters 53 are disposed at intervals in the circumferential direction of the substrate 54. The number of light emitters 53 is not limited as long as provided in plurality. In the embodiment, twelve light emitters 53 are disposed at equal intervals in the circumferential direction of the tubular portion 82 (refer to FIG. 11).

The light unit 17 includes an optical member 57.

The optical member 57 is connected to the light unit 17. The optical member 57 is formed of polycarbonate resin. In the embodiment, the optical member 57 is formed of a polycarbonate resin containing a white diffusion material. The optical member 57 is milky white. The optical member 57 transmits at least a part of the light emitted from the light unit 17. The optical member 57 has a light transmittance of 40% or more and 70% or less, for example. The optical member 57 diffuses the light from the light emitters 53.

The optical member 57 is disposed so as to cover front sides of the plurality of light emitters 53. At least a part of the optical member 57 is disposed forward of the light unit 17. The optical member 57 is continuous over the light emitters 53. The optical member 57 is formed in a hoop shape surrounding the anvil 10 so as to cover the light emitters 53. The optical member 57 has an annular shape. The optical member 57 includes an outer tube 57A, an inner tube 57B, a light transmitter 57C, and a protrusion 57D.

As illustrated in FIG. 10, the outer tube 57A is disposed outside the inner tube 57B in the radial direction. In the radial direction, the light emitters 53 are disposed between the outer tube 57A and the inner tube 57B. The inner tube 57B is disposed outside the tubular portion 82 of the case 4 in the radial direction. The light transmitter 57C is disposed on the lower side of the plurality of light emitters 53. The light transmitter 57C has an annular shape. The light transmitter 57C is disposed so as to connect the front end of the outer tube 57A and the front end of the inner tube 57B. The light transmitter 57C faces the lower surface of the substrate 54. The light transmitter 57C faces the light emitters 53. The light emitted from the light emitters 53 passes through the light transmitter 57C and is projected to the lower side of the light unit 17. The lower surface of the light transmitter 57C constitutes a light emitting surface of the light unit 17.

The protrusion 57D is disposed rearward of the light transmitter 57C. The protrusion 57D is provided so as to protrude rearward from the rear portion of the outer tube 57A. The protrusion 57D is disposed between the pair of guide projections 83 (refer to FIGS. 14 and 15) of the case 4, thereby functioning as a positioning portion of the light unit 17 in the rotation direction.

As illustrated in FIG. 10, the upper surface of the substrate 54 is disposed on the lower side of the upper end of the outer tube 57A and the upper end of the inner tube 57B. The substrate 54 and the plurality of light emitters 53 are disposed in a recessed accommodating space formed by the outer tube 57A, the inner tube 57B, and the light transmitter 57C of the optical member 57. An upper surface of the accommodating space is open. The accommodating space is filled with a molding resin 58. The plurality of light emitters 53, the substrate 54, the optical member 57, and a part of the lead wires 65 are fixed to each other by the molding resin 58.

The case 4 holds the light unit 17. The light unit 17 including the light emitters 53 is held on the lower surface of the case 4. The electric power tool 1 includes a light cover 60 disposed on a lower surface of the case 4 to hold the light emitter 53 and cover the lead wires 65.

Light Cover

As illustrated in FIGS. 12 and 13, the light cover 60 is separate from the motor housing 21. The light cover 60 is separate from the case 4. The light cover 60 is engaged with the motor housing 21. The light cover 60 is mounted to the lower surface of the case 4. The light cover 60 holds the light unit 17 on the lower surface of the case 4. The light unit 17 is held between the lower surface of the case 4 and the light cover 60. The light cover 60 is formed of resin, for example.

The light cover 60 includes a light emitter holder 61 and a cover 62. The light cover 60 is a single member in which the light emitter holder 61 and the cover 62 are integrated to each other. The light emitter holder 61 is separate from the motor housing 21. The cover 62 is separate from the motor housing 21. The light emitter holder 61 is separate from the case 4. The cover 62 is separate from the case 4.

The light emitter holder 61 is disposed on the lower surface of the case 4 and holds the light emitters 53. The light emitter holder 61 and the light emitter holder 61 are disposed on the placement surface 81. The light emitter holder 61 is provided circumferentially along the outer periphery of the optical member 57. The light emitter holder 61 has a ring shape surrounding the outer periphery of the optical member 57. The light emitter holder 61 has a peripheral wall 61A surrounding the periphery of the optical member 57. The peripheral wall 61A has a ring shape. The peripheral wall 61A extends in the up-down direction from the placement surface 81 of the case 4 to the lower surface of the optical member 57. The light emitter holder 61 has a locking portion 61B protruding inward in the radial direction from the lower end of the peripheral wall 61A. The locking portion 61B is provided over the entire circumference of the inner periphery of the peripheral wall 61A. The locking portion 61B is positioned rearward of the lower surface of the optical member 57. The locking portion 61B comes into contact with the lower surface of the optical member 57 from the lower side. The locking portion 61B is locally brought into contact, so as to be caught, with an outer peripheral edge of the lower surface of the optical member 57. The locking portion 61B is located on the outer circumferential side of the light emitters 53 on the lower surface of the optical member 57. The light emitter holder 61 supports the lower surface of the optical member 57 at the locking portion 61B. As described above, since the light unit 17 including the optical member 57, the light emitters 53, and the substrate 54 is integrated by the molding resin 58, the light emitter holder 61 supports the entire light unit 17 including the light emitters 53 from the lower side by supporting the lower surface of the optical member 57. The light emitter holder 61 exposes a part of the lower surface of the optical member 57, specifically, a position immediately below the light emitters 53 and a position on the inner circumferential side of the light emitters 53.

The light emitter holder 61 is fixed to the lower surface of the case 4 by screws 60S, and the screws 60S tightens the light emitter holder 61 toward the lower surface of the case 4. By pressing the lower surface of the optical member 57 toward the case 4 by the locking portion 61B, the light emitter holder 61 holds the light emitters 53. The light emitter holder 61 presses the outer peripheral edge of the lower surface of the optical member 57.

On the lower surface of the case 4, the light emitter holder 61 is fixed by the screws 60S at a plurality of positions around the optical member 57. The light emitter holder 61 is fixed by four screws 60S at four corners of the lower surface of the case 4. On the flat placement surface 81 of the lower surface of the case 4, a screw holes 81A are formed. The screw holes 81A are disposed at four corners surrounding the periphery of the tubular portion 82. That is, the four screw holes 81A are disposed at intervals of about 90 degrees in the rotation direction of the tubular portion 82. The peripheral wall 61A has bosses 61H to which the screws 60S are attached. The bosses 61H are disposed at four corner positions surrounding the periphery of the tubular portion 82 and respectively corresponding to the screw holes 81A of the placement surface 81 The bosses 61H have insertion holes through which the respective screws 60S pass. The screws 60S pass through the insertion holes of the bosses 61H from the lower side and is fixed to the screw holes 81A. By the axial force of the screws 60S, the light emitter holder 61 presses the optical member 57 upward from the positions of the four corners around the optical member 57 toward the placement surface 81.

As illustrated in FIG. 10, the electric power tool 1 further includes a buffer member 59 disposed between the light emitter 53 and the lower surface of the case 4; the buffer member 59 is disposed above the light unit 17. The buffer member 59 is an elastic body, and is formed of a rubber material, for example. The buffer member 59 protects the substrate 54 and the optical member 57 against the contact with the case 4 which is a metal vibrating body. The buffer member 59 covers at least a part of the upper surface of the light unit 17. By interposition of the buffer member 59, the light unit 17 is held between the placement surface 81 and the light emitter holder 61 in a state of being separated from the placement surface 81 of the case 4.

The buffer member 59 has a ring shape. The buffer member 59 overlaps the light unit 17 on the entire circumference in the circumferential direction. The buffer member 59 is held in an elastically deformed state by being clamped between the light unit 17 and the placement surface 81. The buffer member 59 is pressed by the light unit 17 by the axial force of the screws 60S. The buffer member 59 is deformed in accordance with the shape of the upper surface side of the light unit 17 so as to fill the gap between the light unit 17 and the placement surface 81. The upper surface of the buffer member 59 comes in contact with the placement surface 81 and the tubular portion 82. The lower surface of the buffer member 59 comes in contact with the light unit 17.

As illustrated in FIGS. 12 and 13, the cover 62 covers the lead wires 65. The lead wires 65 extends from the motor housing 21. The lead wires 65 are connected to the plurality of light emitters 53. In other words, the lead wires 65 extend from the light unit 17 to the motor housing 21 along the lower surface of the case 4. The lead wires 65 connect the plurality of light emitters 53 to the controller 18. The lead wires 65 (refer to FIG. 4) pass through the battery holder 23 and the inside of the motor housing 21 from the controller 18, and extends from a lower opening 21D on the front surface of the motor housing 21 to the lower surface side of the case 4. The lead wires 65 extend forward along the lower surface of the case 4 and is connected to the substrate 54 of the light unit 17. This allows the lead wires 65 to be connected to the plurality of light emitters 53 on the substrate 54 to supply power.

As illustrated in FIG. 15, the lead wires 65 include: a first lead wire 65A extending from the motor housing 21; and a second lead wire 65B connected to the first lead wire 65A via a connector 66 and connected to the plurality of light emitters 53. The first lead wire 65A extends forward from the inside of the motor housing 21 through the lower opening 21D of the motor housing 21 and extends to the lower surface of the case 4. The first lead wire 65A has a connector 66A on one side. The second lead wire 65B extends rearward from the substrate 54 of the light unit 17 along the lower surface of the case 4. The second lead wire 65B has a connector 66B on the other side. The connection between the connector 66A of the first lead wire 65A and the connector 66B of the second lead wire 65B enables electrical connection between the first lead wire 65A and the second lead wire 65B. The connector 66A and the connector 66B are attachable/detachable by insertion/removal. When the connector 66B is separated from the connector 66A, a subassembly, including the light unit 17, the second lead wire 65B, and the connector 66B, can be separated from the electric power tool 1.

As illustrated in FIGS. 14 and 15, the case 4 has a groove 84 in which the lead wires 65 are disposed on the lower surface of the case 4. The groove 84 is a recess-shaped portion recessed upward from the lower surface of the case 4. The groove 84 is provided in the front-rear direction on the lower surface of the case 4 in a range from the rear end of the placement surface 81 to the rear end of the case 4. The first lead wire 65A and the second lead wire 65B are disposed in the groove 84. The connector 66A of the first lead wire 65A and the connector 66B of the second lead wire 65B are jointed to each other at the groove 84.

The electric power tool 1 includes a ground wire 67 extending from the motor housing 21 and connected to the lower surface of the case 4. The ground wire 67 is connected to a ground terminal 84B provided on the lower surface of the case 4. The ground terminal 84B is disposed in the groove 84. The ground wire 67 passes from the lower opening 21D of the motor housing 21 through the groove 84 to be connected to the ground terminal 84B. The lead wires 65 and ground wire 67 are all disposed in the groove 84.

The groove 84 has a passage 84A having a narrow width at an end on the rear side. The passage 84A extends to the rear surface of the case 4. The lead wires 65 and the ground wire 67 extending from the lower opening 21D (refer to FIG. 13) of the motor housing 21 pass through the passage 84A. The passage 84A allows the starting position of the lead wires 65 and ground wire 67 on the lower surface of the case 4 to be defined at the position of passage 84A, and allows the plurality of wires to be bundled together.

The cover 62 covers the lead wires 65 and the ground wire 67. The cover 62 covers the groove 84 in which the lead wires 65 are disposed. The cover 62 covers the ground wire 67 and the ground terminal 84B. The cover 62 extends from the arrangement positions of the plurality of light emitters 53 to the motor housing 21 on the lower surface of the case 4. Specifically, the cover 62 extends rearward from the rear end of the light emitter holder 61. The cover 62 extends to the front surface of the motor housing 21. The cover 62 covers the entire groove 84.

As illustrated in FIG. 16, the cover 62 has a cover recess 63 recessed downward from the upper surface side, in contrast to the groove 84. Between the lower surface of the case 4 and the cover 62, there is provided an accommodating space for wiring, constituted by the groove 84 and the cover recess 63.

The cover 62 has a claw 62A that engages with the motor housing 21. The claw 62A is disposed at the rear end of the cover 62. The claw 62A protrudes rearward from the rear end of the cover 62. The claw 62A is inserted into the lower opening 21D of the motor housing 21 so as to be engaged with the motor housing 21 (refer to FIG. 13). Due to the engagement between the motor housing 21 and the claw 62A, the rear end of the cover 62 is movable in the front-rear direction and is not movable downward. The cover 62 is fixed to the case 4 in a state where the claw 62A is engaged with the motor housing 21. The cover 62 covers the entire lower opening 21D of the motor housing 21.

As illustrated in FIGS. 12 and 13, the light cover 60 including the light emitter holder 61 and the cover 62 covers substantially the entire lower surface of the case 4. At the time of assembling the electric power tool 1, the assembly operator disposes the light unit 17 on the placement surface 81 via the buffer member 59, connects the connector 66A and the connector 66B to each other, and then mounts the light cover 60 to the case 4. The light cover 60 is fixed to the case 4 with the screws 60S at the four bosses 61H in a state where the claws 62A are inserted into and engaged with the lower opening 21D of the motor housing 21. When replacing the light unit 17 for maintenance or the like, it is possible to remove the light assembly, including the light unit 17, the second lead wire 65B, and the connector 66B, from the electric power tool 1 only by detaching the light cover 60 from the case 4 in the reverse procedure and then separating the connector 66A and the connector 66B from each other.

Bearing Holding Structure

Figure 17:
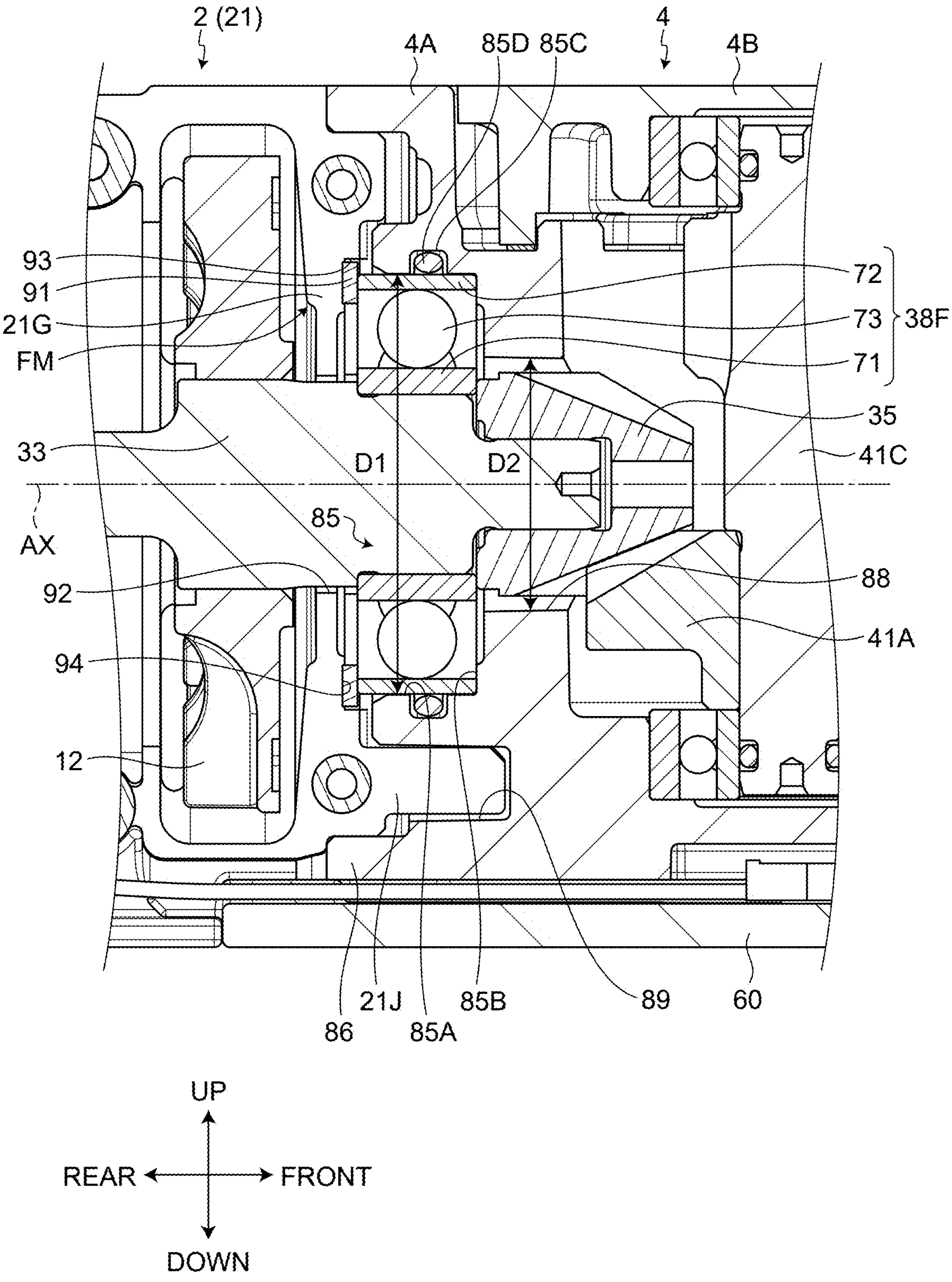
FIG. 17 is a longitudinal sectional view illustrating surroundings of a bevel gear of the electric power tool according to the embodiment.
Figure 18:
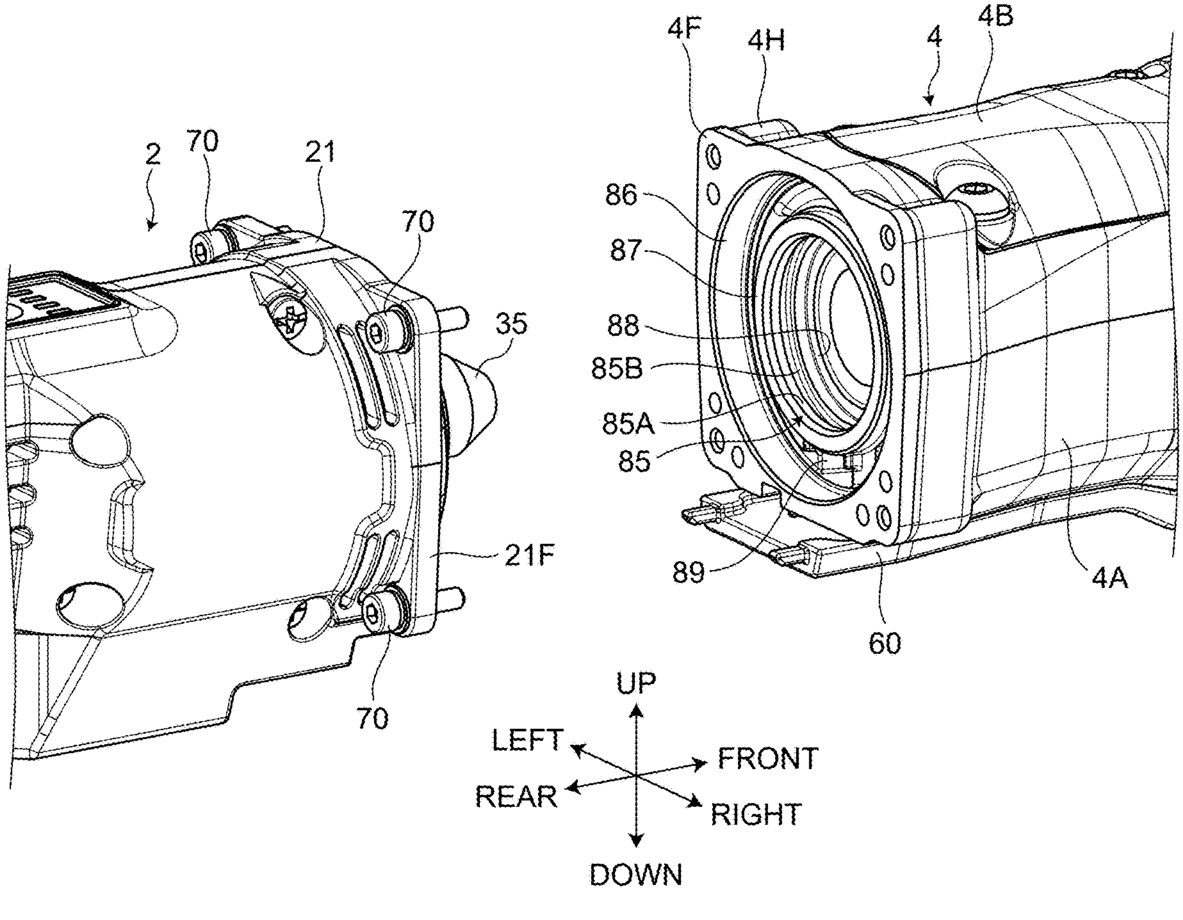
FIG. 18 is an exploded perspective view illustrating a rear surface of a case according to the embodiment.
Figure 19:
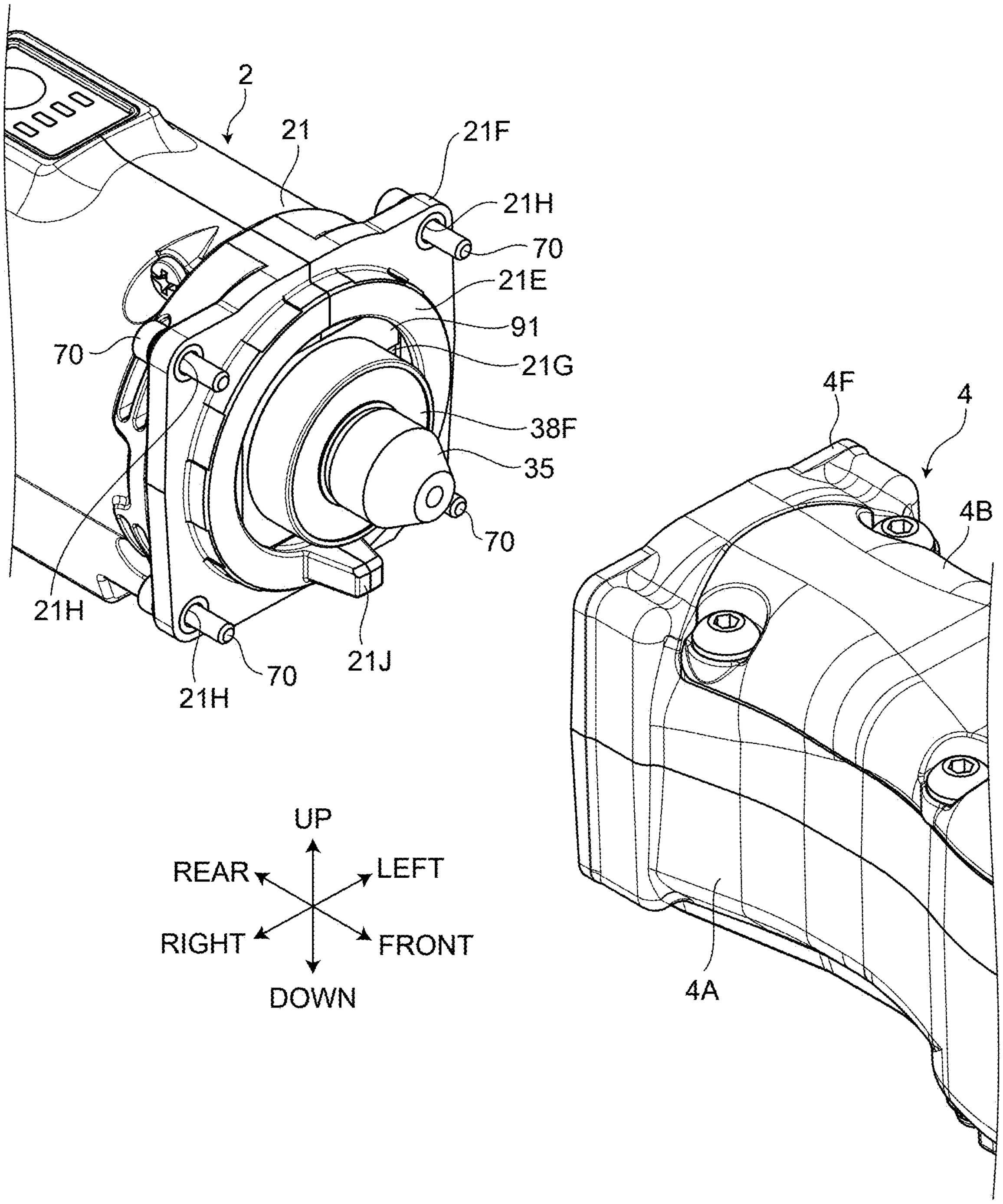
FIG. 19 is an exploded perspective view illustrating a front surface of a motor housing according to the embodiment.
Figure 20:
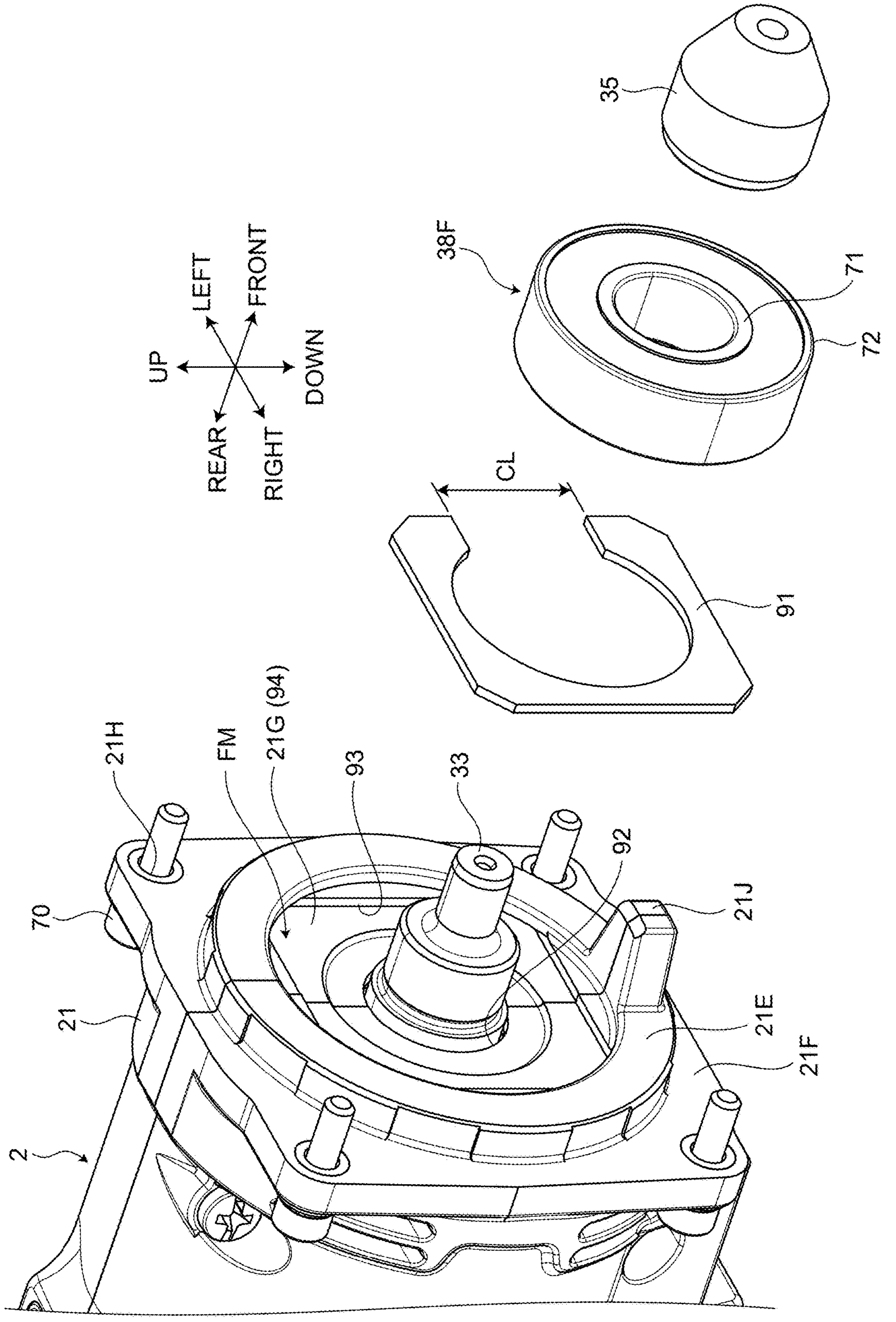
FIG. 20 is an exploded perspective view illustrating a bevel gear, a bearing, and an intermediate support member according to the embodiment.
Figure 21:
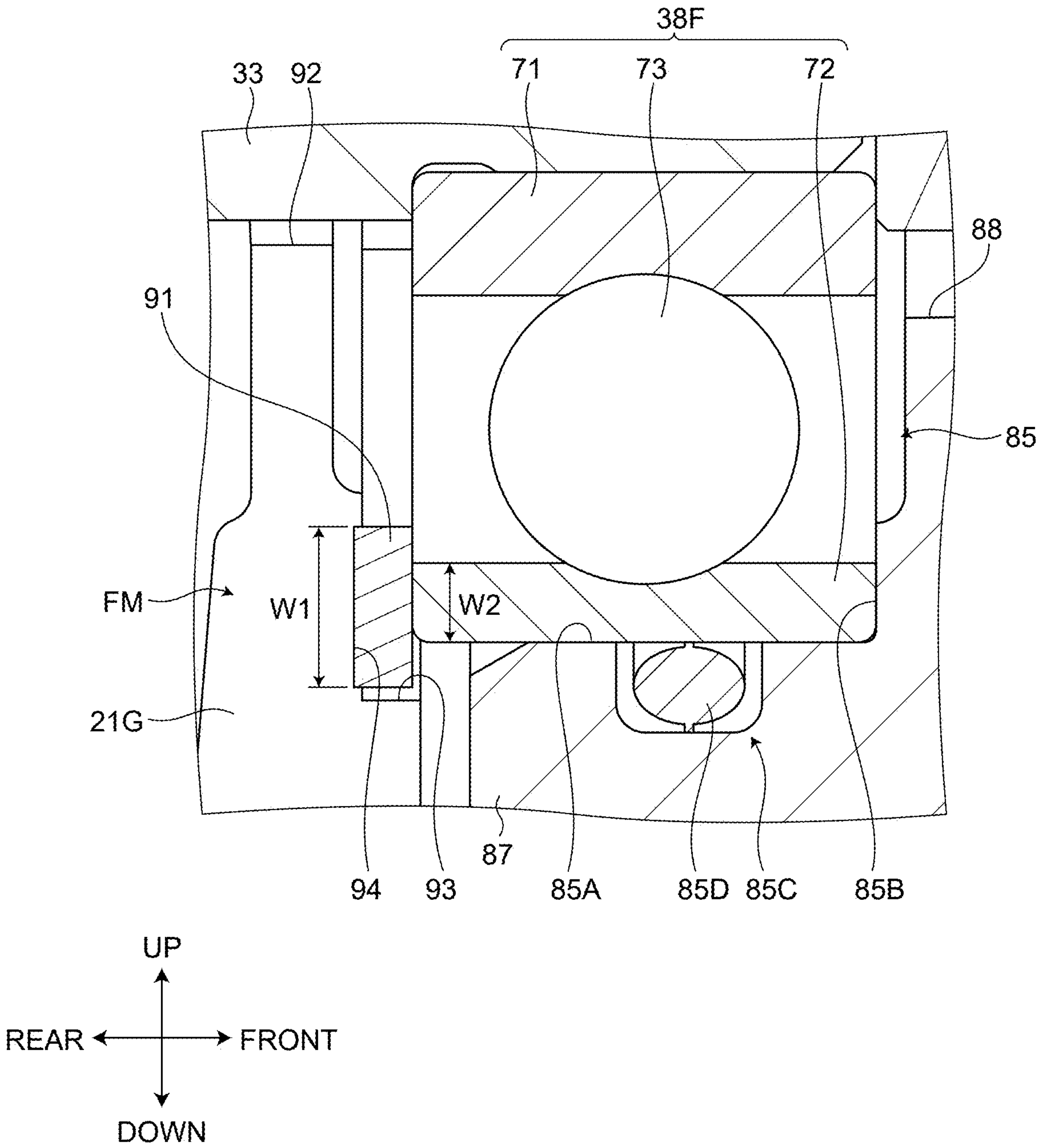
FIG. 21 is a longitudinal sectional view illustrating the intermediate support member according to the embodiment.

FIG. 17 is a longitudinal sectional view illustrating surroundings of the bevel gear 35 of the electric power tool 1 according to the embodiment. FIG. 18 is an exploded perspective view illustrating a rear surface of the case 4 according to the embodiment. FIG. 19 is an exploded perspective view illustrating the front surface of the motor housing 21 according to the embodiment. FIG. 20 is an exploded perspective view illustrating the bevel gear 35, the bearing 38F, and the intermediate support member 91 according to the embodiment. FIG. 21 is a longitudinal sectional view illustrating the intermediate support member 91 according to the embodiment.

As described above, the electric power tool 1 includes the bearing 38F that holds the bevel gear 35 to be rotatable. The bearing 38F comes in contact with the rotor shaft 33 and holds the bevel gear 35 to be rotatable via the rotor shaft 33. The bearing 38F is held by the case 4. The bearing 38F is held at the rear portion of the case 4.

As illustrated in FIG. 17, the electric power tool 1 includes: the intermediate support member 91 having a front surface coming in contact with the bearing 38F; and a fixing member FM coming in contact with a rear surface of the intermediate support member 91. The fixing member FM, together with the case 4, fixes the intermediate support member 91 only by clamping. Therefore, the fixing member FM and the case 4 clamp the bearing 38F and the intermediate support member 91 disposed on the rear surface of the bearing 38F, whereby the intermediate support member 91 is held.

The fixing member FM may be an independent member, or may be integrally formed with a member included in the electric power tool 1 so as to constitute a part of the member. In the embodiment, the fixing member FM is integrally formed with the motor housing 21. The fixing member FM is a support wall 21G integrally formed with the motor housing 21. Accordingly, the bearing 38F is clamped between the motor housing 21 and the case 4 connected to each other in the front-rear direction.

The bearing 38F is a ball bearing having an inner ring 71, an outer ring 72, and balls 73. The rotor shaft 33 is fitted to the inner ring 71. The front end of the inner ring 71 faces the rear surface of the bevel gear 35. The rear end of the inner ring 71 faces the stepped portion of the rotor shaft 33.

As illustrated in FIGS. 17 and 18, the case 4 has an accommodating recess 85, which is recessed forward from the rear portion of the case 4 and accommodates the bearing 38F. The bearing 38F is disposed inside the accommodating recess 85. The case 4 includes: an outer tube 86 in which the case flange 4F is formed; and an inner tube 87 in which the accommodating recess 85 is formed. The inner tube 87 is formed inside the outer tube 86 in the radial direction. The inner tube 87 has a cylindrical shape and has its inner diameter decreasing stepwise. That is, the inner tube 87 includes: the accommodating recess 85 having an inner diameter D1; and a hole 88 having an inner diameter D2. The inner diameter D2 is smaller than the inner diameter D1. The accommodating recess 85 is a recess recessed forward from the rear surface of the case 4. The bearing 38F is disposed in the accommodating recess 85. The bearing 38F comes in contact with an inner peripheral surface of the accommodating recess 85 and a front surface (a portion forming a step with the hole 88) of the accommodating recess 85 corresponding to a bottom surface of the accommodating recess 85. The hole 88 is a through hole along the rotation axis AX. The bevel gear 35 is disposed in the hole 88. The bevel gear 35 passes through the hole 88 and meshes with the driven gear 41A.

With this configuration, the case 4 includes: a radial support surface 85A that supports a radial load acting on the bearing 38F; and a front support surface 85B that supports a forward thrust load acting on the bearing 38F. The radial support surface 85A is an inner peripheral surface of the accommodating recess 85. The front support surface 85B is a front surface (bottom surface) of the accommodating recess 85.

The radial support surface 85A has an annular shape. The outer ring 72 of the bearing 38F is fitted to the radial support surface 85A. The radial support surface 85A has a groove 85D in which an O-ring 85C is disposed. The O-ring 85C comes in contact with the inner surface of the groove 85D and the outer ring 72.

The front support surface 85B has an annular shape. The front support surface 85B faces the outer ring 72 of the bearing 38F in the front-rear direction. The front support surface 85B comes in contact with the front end surface of the outer ring 72.

As illustrated in FIGS. 17, 19, and 20, the support wall 21G, which is the fixing member FM, directly or indirectly supports the rear surface of the bearing 38F on the front surface of the motor housing 21. In the embodiment, the support wall 21G indirectly supports the rear surface of the bearing 38F via the intermediate support member 91. The support wall 21G constitutes a part of the front surface of the motor housing 21.

Specifically, the front surface of the motor housing 21 includes: a housing flange 21F provided with screw insertion holes 21H at four corners; a hoop-shaped rib 21E protruding in the front direction from the housing flange 21F; and a support wall 21G. The hoop-shaped rib 21E is disposed in a space between the outer tube 86 and the inner tube 87 of the case 4. The inner tube 87 is disposed on the inner periphery of the hoop-shaped rib 21E. At the lower portion of the hoop-shaped rib 21E, there is provided a projection 21J protruding in the front direction. The projection 21J is inserted into an engagement hole 89 of the case 4. The projection 21J and the engagement hole 89 perform rotational positioning of the case 4 about the rotation axis AX with respect to the motor housing 21.

The support wall 21G is disposed inside the hoop-shaped rib 21E. The support wall 21G extends inward in the radial direction from the hoop-shaped rib 21E. The support wall 21G has a center opening 92 through which the rotor shaft 33 passes. The support wall 21G has a ring shape. The support wall 21G faces the front support surface 85B of the accommodating recess 85 in the front-rear direction. The support wall 21G faces the bearing 38F in the front-rear direction. The support wall 21G faces the rear end surface of the outer ring 72 of the bearing 38F via the intermediate support member 91.

On the front surface of the support wall 21G, there is provided a recess 93 in which the intermediate support member 91 is disposed. The recess 93 is recessed rearward from the front surface. The recess 93 has a shape corresponding to the outer shape of the intermediate support member 91, and allows the intermediate support member 91 to be disposed in the recess 93. The bottom surface of the recess 93 recessed rearward is the rear support surface 94 that comes into contact with the rear surface of the intermediate support member 91. The rear support surface 94 supports a rearward thrust load acting on the bearing 38F. In this manner, the motor housing 21 has the rear support surface 94 that supports the rearward thrust load acting on the bearing 38F. The rear support surface 94 is a front surface of the support wall 21G, and is also a bottom surface of the recess 93 in which the intermediate support member 91 is disposed.

The intermediate support member 91 comes in contact with the rear surface of the bearing 38F on the front surface and also comes in contact with the fixing member FM on the rear surface. The front surface of the intermediate support member 91 comes in contact with the rear end surface of the outer ring 72 of the bearing 38F. The rear surface of the intermediate support member 91 comes in contact with the rear support surface 94 of the front surface of the support wall 21G which is the fixing member FM. The intermediate support member 91 has a flat plate shape with a uniform thickness.

The intermediate support member 91 is provided along the rear surface of the bearing 38F. The front surface of the intermediate support member 91 extends circumferentially along the rear end surface of the outer ring 72 of the bearing 38F. The intermediate support member 91 is provided so as to surround the periphery of the rotor shaft 33 and has a C-shape including two ends, being one end and the other end. That is, the intermediate support member 91 has a non-ring shape, having a clearance CL formed between one end and the other end. In the embodiment, the clearance CL is larger than the diameter of the rotor shaft 33 in the cross section along the front surface of the intermediate support member 91. The inner periphery of the intermediate support member 91 has an arc shape. Each side of the outer periphery of the intermediate support member 91 forms as a straight line, and the outer periphery of the intermediate support member 91 is quadrangular except for the portion of the clearance CL.

As described above, the fixing member FM, together with the case 4, fixes the intermediate support member 91 only by clamping. "Fixing only by clamping" means that there is no structure for fixing the intermediate support member 91 by other members such as screws or rivets, for example, other than clamping the intermediate support member 91 by the fixing member FM and the case 4. The intermediate support member 91 has no screw insertion holes.

One of the intermediate support member 91 or the fixing member FM elastically deforms the other. That is, one of the intermediate support member 91 or the fixing member FM is assembled in a state of being compressed in the front-rear direction by the force for clamping the intermediate support member 91. This makes it possible to eliminate a gap (backlash) in the front-rear direction of the bearing 38F between the case 4 and the fixing member FM.

Although either the intermediate support member 91 or the fixing member FM may be elastically deformed, in the embodiment, the fixing member FM is elastically deformed as illustrated in FIG. 21. Specifically, the intermediate support member 91 is higher in hardness than the fixing member FM. The intermediate support member 91 is formed of metal. The fixing member FM is formed of resin. The fixing member FM is elastically deformed to clamp the intermediate support member 91. The intermediate support member 91 is clamped in a state where its rear surface is slightly pressed into the fixing member FM. For convenience, the deformation state of the fixing member FM is not illustrated in individual drawings other than FIG. 21.

In the embodiment, a width W1 of the rear surface of the intermediate support member 91 in the radial direction is larger than a width W2 (that is, the thickness of the outer ring 72) of the outer ring 72 in the radial direction. Therefore, the intermediate support member 91 can come into contact with the fixing member FM with an area larger than the outer ring 72, achieving a function of distributing the thrust load applied from the outer ring 72.

Here, the load acting on the bearing 38F will be described. In the embodiment, the bevel gear 35 and the driven gear 41A are spiral bevel gears. The spiral bevel gear is a bevel gear in which a tooth line is spirally curved around a rotation axis. The spiral bevel gear has characteristics such as high strength (high torque transmission), low noise, low vibration, and low abrasion due to the larger contact area between the gears and the greater number of simultaneous meshing teeth, as compared with a straight bevel gear in which tooth lines extend radially in straight lines.

In the rotation transmission of the spiral bevel gear, not only a radial load but also a thrust load is generated. Regarding the thrust load, depending on the tooth number ratio between the bevel gear 35 and the driven gear 41A, the direction of action of the thrust load may be reversed in accordance with the difference in rotation direction between the forward rotation and the reverse rotation. This produces a possibility that the radial load in the radial direction, the thrust load in the forward direction and the thrust load in the rearward direction in the rotation axis AX would act on the bevel gear 35.

In FIG. 17, since the bevel gear 35 is fixed to the rotor shaft 33 and the inner ring 71 of the bearing 38F is fixed to the rotor shaft 33, the thrust load acting on the bevel gear 35 is transmitted to the bearing 38F. The thrust load in the forward direction transmitted to the bearing 38F is supported by the front support surface 85B of the case 4 via the outer ring 72. The thrust load in the rearward direction transmitted to the bearing 38F acts on the intermediate support member 91 via the outer ring 72, and is further supported by the rear support surface 94 of the support wall 21G being the fixing member FM, via the intermediate support member 91. When the thickness of the outer ring 72 is small, the contact portion with the outer ring 72 becomes close to line contact, causing local action of a large surface pressure. However, by interposing the intermediate support member 91 between the outer ring 72 and the rear support surface 94 to increase the contact area with the rear support surface 94, it is possible to reduce the surface pressure acting on the rear support surface 94 formed in the resin motor housing 21.

The radial load acting on the bevel gear 35 acts on the bearing 38F via the rotor shaft 33, and is supported by the radial support surface 85A of the case 4.

Assembling Workability of Intermediate Support Member

Figure 22:
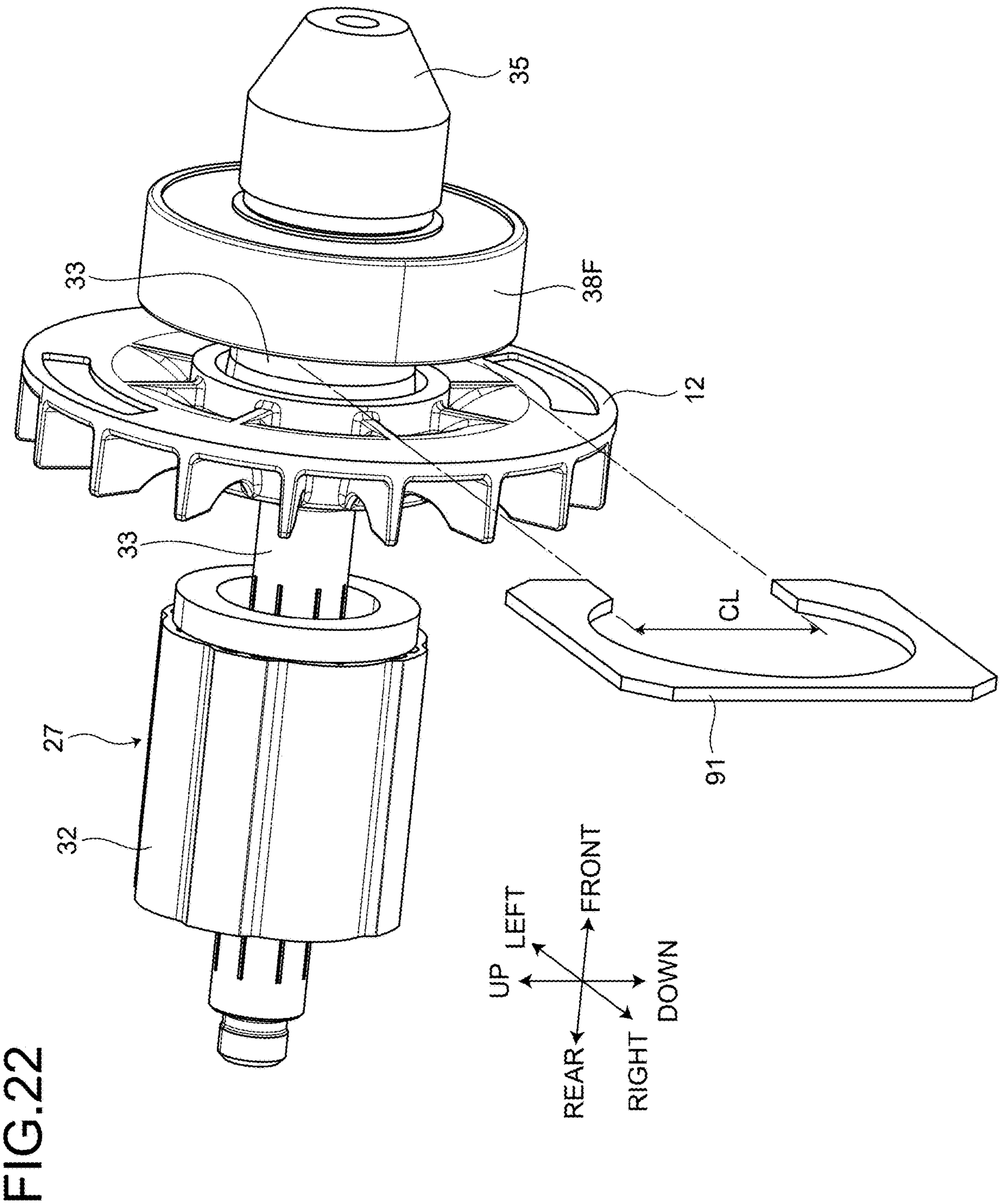
FIG. 22 is an exploded perspective view illustrating a subassembly of a rotor according to the embodiment.

FIG. 22 is an exploded perspective view illustrating a subassembly of the rotor 27 according to the embodiment. As illustrated in FIG. 22, in the assembling of the electric power tool 1, a subassembly is assembled in advance in which related members such as the bearing 38F and the intermediate support member 91 are assembled to the rotor 27. These members are assembled to the rotor shaft 33 such that the fan 12, the intermediate support member 91, the bearing 38F, and the bevel gear 35 are arranged in order from the rear position. In the embodiment, since the intermediate support member 91 has a C-shape, the intermediate support member 91 can be assembled to the rotor shaft 33 in the radial direction by passing the rotor shaft 33 through the portion of the clearance CL. That is, even when the bearing 38F and the bevel gear 35 are mounted first, the intermediate support member 91 can be assembled at a predetermined position later. Therefore, even with a failure to mount the intermediate support member 91, it is possible to handle the problem at later times, leading to high assembling workability.

Using Method

A method of using the electric power tool 1 according to the embodiment will be described. For example, when fastening work is performed on a workpiece, a socket being a tool accessory is attached to the tool accessory holder 51. When the operator operates the trigger lever 14, electric power is supplied from the battery pack 25 to start the motor 6 and allows light to be emitted from the light emitters 53 of the light unit 17. Since the light from the light unit 17 is emitted downward from the surroundings of the anvil 10, the light can reach the work place even in a narrow place with many obstacles. The light emitted from the light unit 17 has high luminosity, making it possible to illuminate the work place with sufficient brightness.

The motor 6 drives to rotate the rotor 27. When the rotor 27 rotates, the rotational force of the rotor 27 is transmitted to the spindle 8 via the speed reducing mechanism 7. The spindle 8 rotates at a rotational speed lower than the rotational speed of the rotor shaft 33. When the spindle 8 rotates in a state where the hammer projections 47B and the anvil projections 10B are in contact with each other, the anvil 10 rotates together with the hammer 47 and the spindle 8. The rotation of the anvil 10 rotates the tool accessory to proceed with the tightening work.

When a load of a predetermined value or more acts on the anvil 10 via the tool accessory with the progress of the tightening work, the rotation of the anvil 10 and the hammer 47 temporarily stops. In a state where the rotation of the hammer 47 has temporarily stopped but the spindle 8 continues to be rotated, the hammer 47 moves upward. When the upward movement of the hammer 47 releases the contact between the hammer projections 47B and the anvil projections 10B, the hammer 47 that has moved upward now moves downward while rotating by the elastic force of the coil spring 49. When the hammer 47 moves downward while rotating, the anvil 10 is impacted in the rotation direction by the hammer 47. This allows the anvil 10 and the tool accessory to rotate about the rotation axis BX with higher torque. This tightens the bolt or the nut with higher torque.

Effects

As described above, in the embodiment, the electric power tool 1 includes: the grip 22 extending in a front-rear direction; the motor housing 21 disposed forward of the grip 22; the motor 6 disposed inside the motor housing 21 and having the stator 26 and the rotor 27, the rotor 27 being rotatable with respect to the stator 26; the bevel gear 35 integrally rotating with the rotor 27 and having a shaft extending in the front-rear direction; the spindle 8 directly or indirectly rotated via the bevel gear 35 and extending in a direction intersecting the front-rear direction; the tool accessory holder 51 rotated by the spindle 8; the case 4 to accommodate the bevel gear 35 and the spindle 8; and the bearing 38F held by the case 4 and configured to hold the bevel gear 35 to be rotatable.

In the above configuration, the bevel gear 35 rotates integrally with the rotor 27, and the bearing 38F is held by the case 4 and holds the bevel gear 35 to be rotatable. Thus, the bearing 38F can be held, together with the bevel gear 35, by the case 4. There is no need to provide a holding member such as a case or a bracket dedicated to bearings separately from the case 4, making it possible to downsize a gear portion of the electric power tool 1.

In the embodiment, the electric power tool 1 further includes: the hammer 47 rotated by the spindle 8; and the anvil 10 directly or indirectly impacted by the hammer 47 in the rotation direction. The tool accessory holder 51 is disposed at the lower end of the anvil 10. The case 4 accommodates the bevel gear 35, the spindle 8, and the hammer 47.

With the above configuration, it is possible to provide the impact tool capable of downsizing a gear portion.

In the embodiment, the rotor 27 includes the rotor shaft 33 extending in the front-rear direction. The rotor shaft 33 extends from the motor housing 21 to the internal space of the case 4. The bevel gear 35 is fixed to the rotor shaft 33.

In the above configuration, the bevel gear 35 is used as a pinion gear fixed to the rotor shaft 33. The bearing 38F that rotatably holds the bevel gear 35 also enables rotational support of the rotor shaft 33. The rotational support of the rotor shaft 33 and the rotational support of the bevel gear 35 can be achieved by the same bearing 38F.

In the embodiment, the bearing 38F comes in contact with the rotor shaft 33 and holds the bevel gear 35 to be rotatable via the rotor shaft 33.

The above configuration has no need to provide a portion of the bevel gear 35 which is to be supported in contact with the bearing 38F, making it possible to downsize the bevel gear 35.

In the embodiment, the case 4 includes: the radial support surface 85A that supports the radial load acting on the bearing 38F; and the front support surface 85B that supports the forward thrust load acting on the bearing 38F.

In the above configuration, the radial load and the forward thrust load caused by the transmission of the rotational force by the bevel gear 35 can be supported by the case 4.

In the embodiment, the motor housing 21 and the case 4 are connected to each other in the front-rear direction. The motor housing 21 has the rear support surface 94 that supports the rearward thrust load acting on the bearing 38F.

In the above configuration, the rearward thrust load caused by the transmission of the rotational force by the bevel gear 35 can be supported by the motor housing 21. With the motor housing 21 and the case 4, it is possible to hold the bearing 38F and support the load.

In the embodiment, the electric power tool 1 includes the intermediate shafts (the first intermediate shaft 41C and the second intermediate shaft 42B) disposed between the bevel gear 35 and the spindle 8 and configured to transmit the rotation of the bevel gear 35 to the spindle 8. The intermediate shaft is accommodated in the case 4 and extend in a direction intersecting the front-rear direction.

In the above configuration, the rotation of the bevel gear 35 can be decelerated by the intermediate shaft (the first intermediate shaft 41C and the second intermediate shaft 42B) and transmitted to the spindle 8. The entire length of the electric power tool 1 in the front-rear direction can be shortened as compared with a situation where the intermediate shaft is directed in the front-rear direction.

In the embodiment, the electric power tool 1 further includes: the first intermediate shaft 41C that includes the driven gear 41A meshing with the bevel gear 35 and that decelerates the rotation of the bevel gear 35; and the second intermediate shaft 42B that decelerates the rotation of the first intermediate shaft 41C and transmits the rotation to the spindle 8.

In the above configuration, deceleration can be performed in a plurality of stages in the process of transmitting rotation to the spindle 8 via the bevel gear 35. This makes it possible to obtain a high torque suitable for the electric power tool 1.

In the embodiment, the spindle 8 extends in a direction orthogonal to the front-rear direction.

With the above configuration, it is possible to obtain an angle electric power tool having the output shaft in the direction orthogonal to the front-rear direction and suitable for the work in the narrow place.

In the embodiment, the electric power tool 1 includes: the grip 22 extending in the front-rear direction; the motor housing 21 disposed forward of the grip 22; the motor 6 disposed inside the motor housing 21 and having the stator 26 and the rotor 27, the rotor 27 being rotatable with respect to the stator 26; the pinion gear (bevel gear 35) integrally rotating with the rotor 27; the speed reducing mechanism 7 connected to the pinion gear; the spindle 8 connected to the speed reducing mechanism 7 and extending in a direction intersecting the front-rear direction; the tool accessory holder 51 rotated by the spindle 8; the case 4 accommodating the pinion gear, the speed reducing mechanism 7, and the spindle 8; and the bearing 38F held by the case 4 and configured to hold the pinion gear to be rotatable.

In the above configuration, the pinion gear rotates integrally with the rotor 27, and the bearing 38F is held by the case 4 and holds the pinion gear to be rotatable. Thus, the bearing 38F can be held, together with the pinion gear, by the case 4. There is no need to provide a holding member such as a case or a bracket dedicated to bearings separately from the case 4, making it possible to downsize a gear portion of the electric power tool 1.

In the embodiment, the motor housing 21 and the case 4 are connected to each other in the front-rear direction. The bearing 38F is clamped between the motor housing 21 and the case 4.

In the above configuration, since the bearing 38F is clamped between the motor housing 21 and the case 4, the bearing 38F can be held without increasing the number of components.

In the embodiment, the case 4 has the accommodating recess 85, which is recessed forward from the rear portion of the case 4 and accommodates the bearing 38F.

In the above configuration, by providing the accommodating recess 85 for accommodating the bearing 38F in the case 4, the radial load acting on the bearing 38F and the forward thrust load can be supported by the case 4.

In the embodiment, the motor housing 21 has the support wall 21G that directly or indirectly supports the rear surface of the bearing 38F on the front surface of the motor housing 21.

In the above configuration, the rearward thrust load acting on the bearing 38F can be supported by the motor housing 21.

In the embodiment, the speed reducing mechanism 7 includes: the first speed reducer 41 connected to the pinion gear (bevel gear 35) and configured to rotate to decelerate the rotation of the pinion gear; and the second speed reducer 42 configured to decelerate the rotation of the first speed reducer 41 and transmit the rotation to the spindle 8.

In the above configuration, deceleration can be performed in a plurality of stages in the process of transmitting rotation to the spindle 8. This makes it possible to obtain a high torque necessary for the electric power tool 1.

In the embodiment, the electric power tool 1 includes: the grip 22 extending in the front-rear direction; the motor housing 21 disposed forward of the grip 22; the motor 6 disposed inside the motor housing 21 and having the stator 26 and the rotor 27, the rotor 27 being rotatable with respect to the stator 26; the bevel gear 35 directly or indirectly rotated by the rotor 27 and having a shaft extending in the front-rear direction; the spindle 8 directly or indirectly rotated via the bevel gear 35 and extending in a direction intersecting the front-rear direction; the tool accessory holder 51 rotated by the spindle 8; the case 4 to accommodate the bevel gear 35 and the spindle 8; the bearing 38F held by the case 4 and configured to hold the bevel gear 35 to be rotatable; and the intermediate support member 91 having a front surface coming in contact with the bearing 38F; and the fixing member FM coming in contact with the rear surface of the intermediate support member 91 to fix the intermediate support member 91, together with the case 4, only by clamping.

In the above configuration, the case 4 supports the bearing 38F that holds the bevel gear 35 to be rotatable, and the intermediate support member 91 and the fixing member FM support the rear surface of the bearing 38F. Even when a thrust load is generated with the transmission of the rotational force by the bevel gear 35, the thrust load can be supported by the case 4 or the fixing member FM via the bearing 38F. Since the intermediate support member 91 coming in contact with the bearing 38F is fixed by being clamped between the case 4 and the fixing member FM, it is possible to prevent occurrence of a gap (backlash) in the thrust load acting direction of the bearing 38F. As a result, the bevel gear 35 can be appropriately held in the angle electric power tool. In addition, since the intermediate support member 91 is fixed only by clamping, there is no need to provide a member such as a screw for fixing the intermediate support member 91. This achieves reduction of the number of parts and downsizing of a gear portion.

In the embodiment, one of the intermediate support member 91 or the fixing member FM elastically deforms the other.

In the above configuration, since the dimensional tolerance can be absorbed by the elastic deformation, it is possible to reliably prevent occurrence of the gap (backlash) in the thrust load acting direction of the bearing 38F.

In the embodiment, the bearing 38F includes the ball bearing having the inner ring 71, the outer ring 72, and the balls 73. The intermediate support member 91 is formed of metal and comes in contact with the outer ring 72. The fixing member FM is formed of resin, and is elastically deformed to clamp the intermediate support member 91.

In the above configuration, the intermediate support member 91, which is a portion coming in contact with the outer ring 72 of the bearing 38F, can be formed of metal to receive a thrust load, and the fixing member FM can be formed of resin to elastically deform. This makes it possible to achieve a structure that endures concentration of load when the thrust load is received from the outer ring 72 while preventing occurrence of a gap (backlash) in the thrust load acting direction of the bearing 38F.

In the embodiment, the width W1 of the rear surface of the intermediate support member 91 in the radial direction is greater than the width W2 of the outer ring 72 in the radial direction.

In the above configuration, the contact area between the rear surface of the intermediate support member 91 and the fixing member FM can be made larger than the contact area between the outer ring 72 and the front surface of the intermediate support member 91. Therefore, when the thrust load is received from the outer ring 72, the contact area can be enlarged by the intermediate support member 91 to reduce the surface pressure acting on the fixing member FM formed of resin.

In the embodiment, the rotor 27 includes the rotor shaft 33 extending in the front-rear direction. The intermediate support member 91 is provided so as to surround the periphery of the rotor shaft 33 along the rear surface of the bearing 38F, and has a C-shape including two ends, being one end and the other end.

The above configuration includes the intermediate support member 91 having a C-shape, making it possible to assembly the intermediate support member 91 to the rotor shaft 33 from the radial direction at the assembly of the electric power tool 1. With this configuration, even when the assembly operator has assembled the components in improper order, the intermediate support member 91 can be assembled later, leading to enhancement of assembly workability.

In the embodiment, the fixing member FM is integrally formed with the motor housing 21.

The above configuration makes it possible to reduce the number of components as compared with the situation where the fixing member FM is provided as a member separate from the motor housing 21, leading to downsizing of a gear portion.

Second Embodiment

A second embodiment will be described. In the following description, the same or equivalent components as those of the above-described embodiment are denoted by the same reference numerals, and the description of the components is simplified or omitted.

Figure 23:
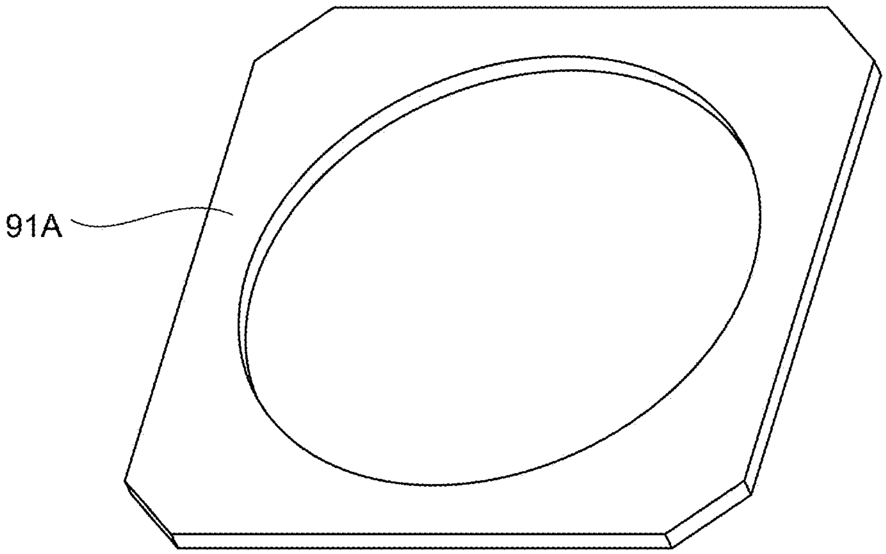
FIG. 23 is a perspective view illustrating an intermediate support member according to a second embodiment.
Figure 24:
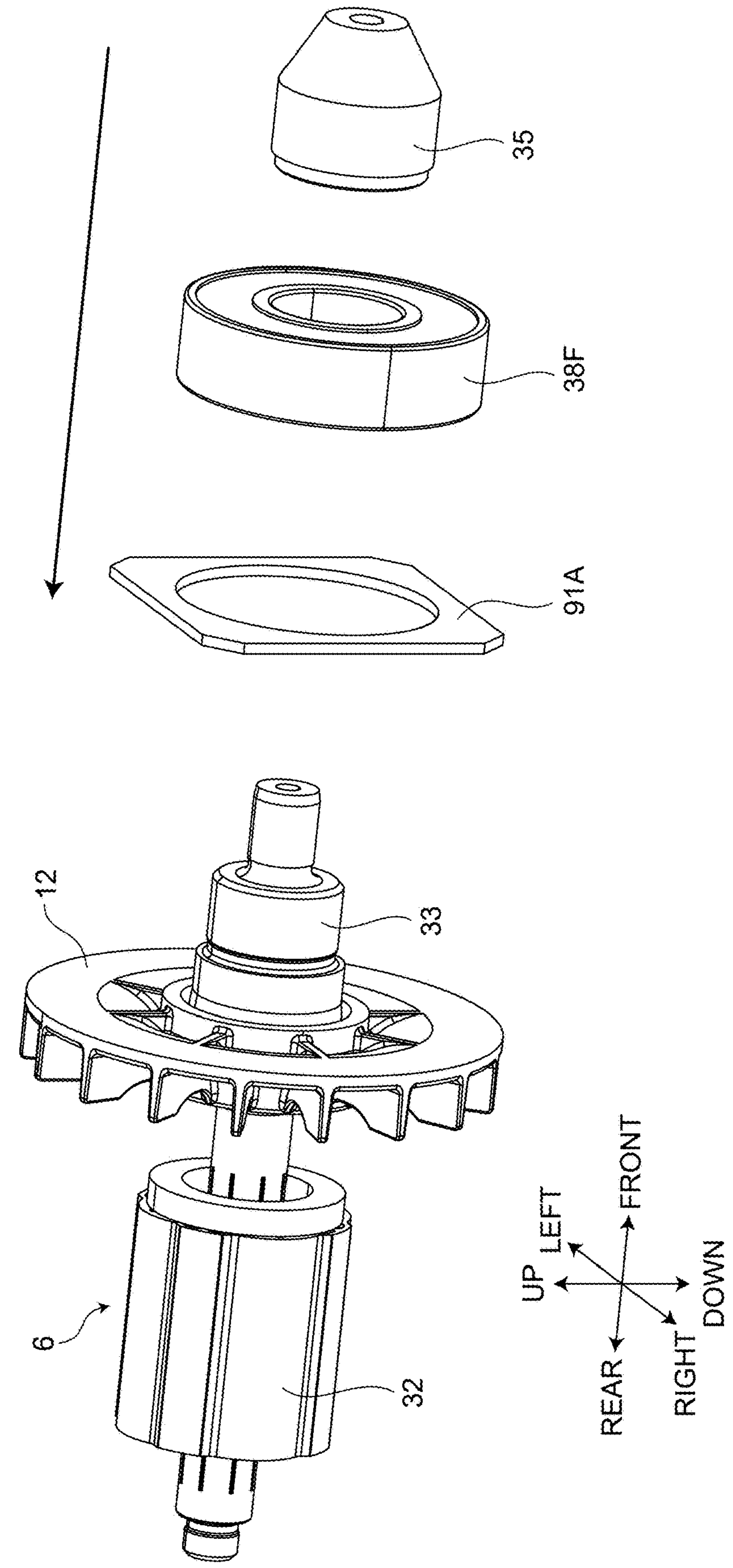
FIG. 24 is an exploded perspective view illustrating a subassembly of a motor according to the second embodiment.

FIG. 23 is a perspective view illustrating an intermediate support member 91A according to the second embodiment. FIG. 24 is an exploded perspective view illustrating a subassembly of a motor 6 according to the second embodiment.

Although the first embodiment has described an example in which the intermediate support member 91 has a C-shape, the intermediate support member 91A according to the second embodiment has a hoop shape.

The intermediate support member 91A has a hoop shape along the rear surface of the bearing 38F. The intermediate support member 91A has a circular inner periphery and a substantially quadrangular outer periphery. The outer periphery of the intermediate support member 91A is chamfered at four corners. The intermediate support member 91A having a hoop shape comes in contact with the rear surface of the bearing 38F over the entire circumference.

Unlike the C-shaped intermediate support member 91, the hoop-shaped intermediate support member 91A cannot be assembled to the rotor shaft 33 from the radial direction. Therefore, the fan 12, the intermediate support member 91A, the bearing 38F, and the bevel gear 35 are assembled to the rotor shaft 33 in the axial direction from the front in this order.

Effects

As described above, in the second embodiment, the intermediate support member 91A has a hoop shape along the rear surface of the bearing 38F.

In the above configuration, the hoop-shaped intermediate support member 91A can support the thrust load on the entire circumference of the bearing 38F.

Third Embodiment

A third embodiment will be described. In the following description, the same or equivalent components as those of the above-described embodiment are denoted by the same reference numerals, and the description of the components is simplified or omitted.

Figure 25:
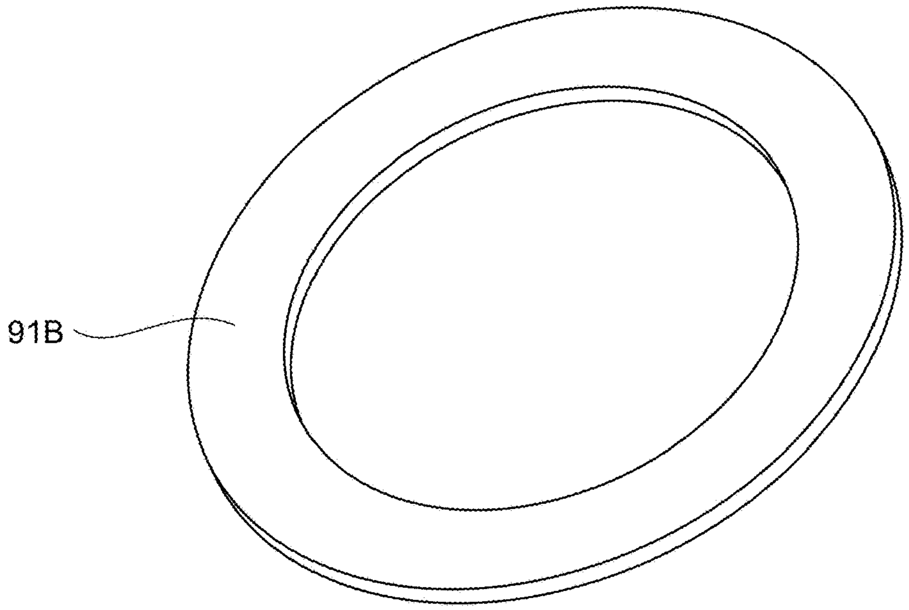
FIG. 25 is a cross-sectional view illustrating an intermediate support member according to a third embodiment.

FIG. 25 is a cross-sectional view illustrating an intermediate support member 91B according to the third embodiment.

Although the second embodiment has described the intermediate support member 91A having a circular inner periphery and a quadrangular outer periphery, the intermediate support member 91B according to the third embodiment has an annular shape.

The intermediate support member 91B has an annular shape along the rear surface of the bearing 38F. The intermediate support member 91B has a circular inner periphery and a circular outer periphery. That is, the intermediate support member 91B is an annular washer. The annular intermediate support member 91B comes in contact with the rear surface of the bearing 38F over the entire circumference. The intermediate support member 91B has a flat plate shape with a uniform thickness.

At assembly of the subassembly, the fan 12, the intermediate support member 91B, the bearing 38F, and the bevel gear 35 are assembled to the rotor shaft 33 in the axial direction from the front in this order.

Fourth Embodiment

A fourth embodiment will be described. In the following description, the same or equivalent components as those of the above-described embodiment are denoted by the same reference numerals, and the description of the components is simplified or omitted.

Figure 26:
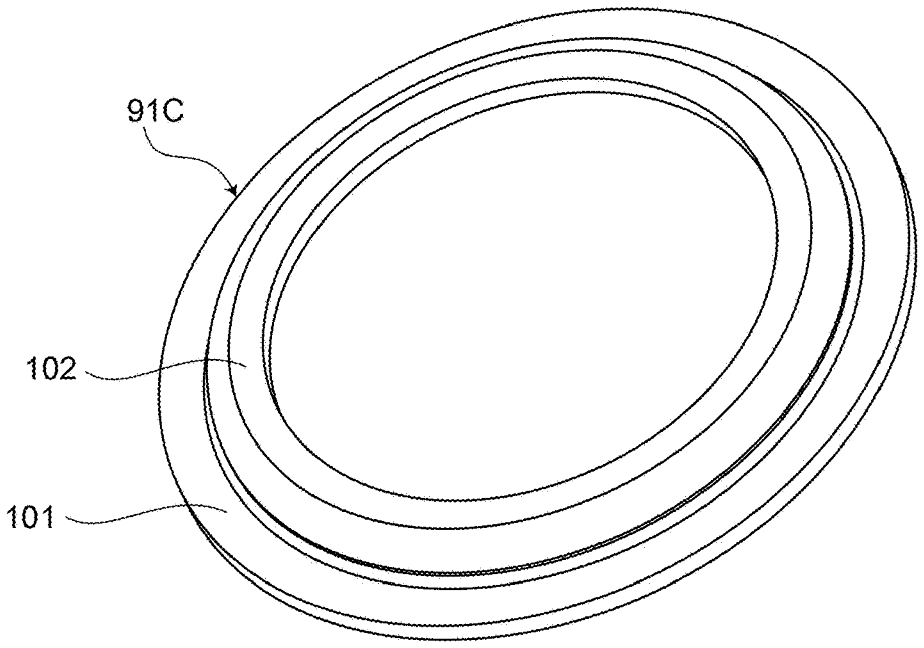
FIG. 26 is a cross-sectional view illustrating an intermediate support member according to a fourth embodiment.
Figure 27:
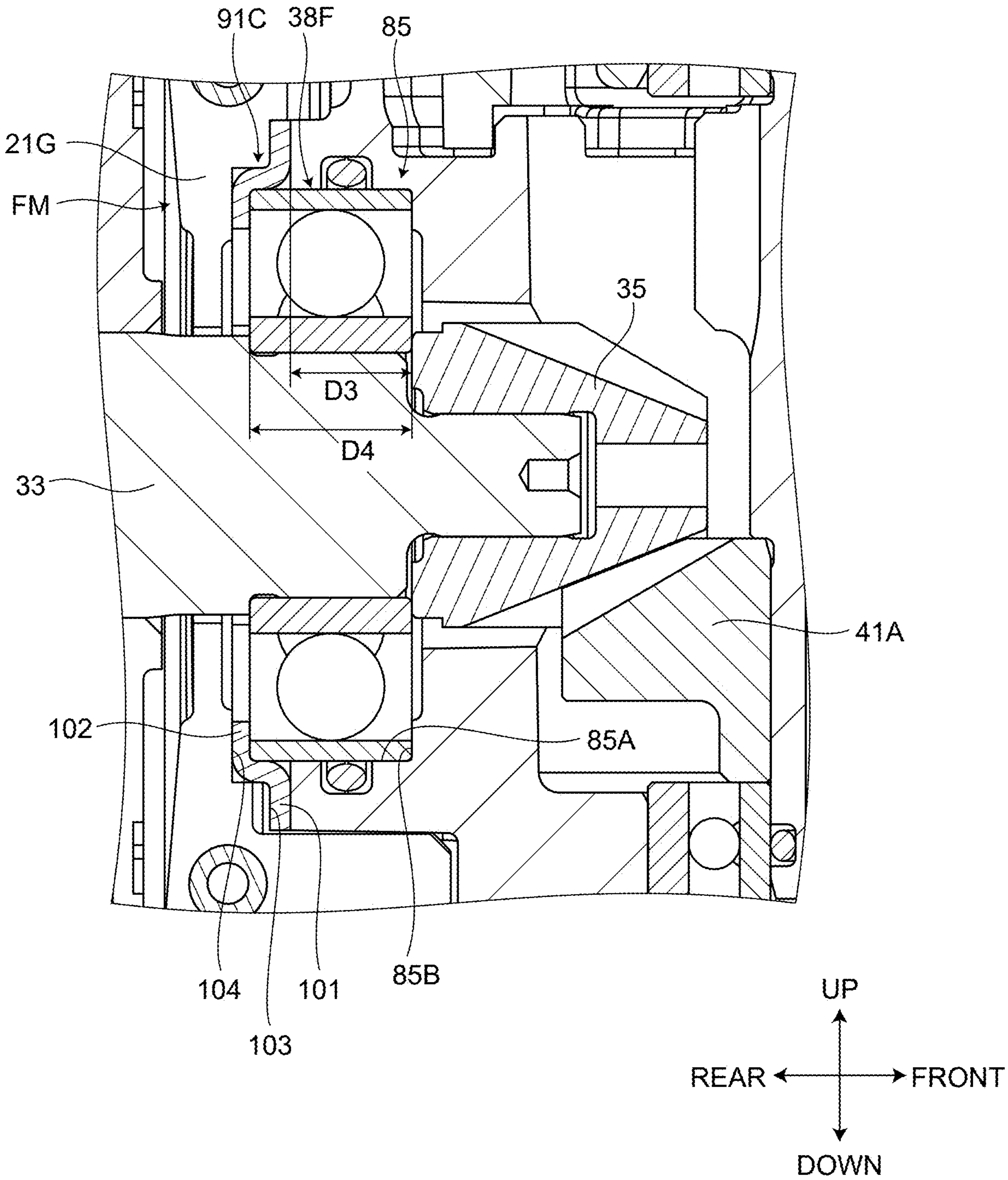
FIG. 27 is a longitudinal sectional view illustrating surroundings of the intermediate support member according to the fourth embodiment.

FIG. 26 is a cross-sectional view illustrating an intermediate support member 91C according to the fourth embodiment. FIG. 27 is a longitudinal sectional view illustrating surroundings of the intermediate support member 91C according to the fourth embodiment.

Although the third embodiment has described the intermediate support member 91B having an annular shape with a uniform thickness, the intermediate support member 91C according to the fourth embodiment has a stepped annular shape.

The intermediate support member 91C has a hoop shape along the rear surface of the bearing 38F. The intermediate support member 91C has a circular inner periphery and a circular outer periphery. That is, the intermediate support member 91C has an annular shape. The annular intermediate support member 91C comes in contact with the rear surface of the bearing 38F over the entire circumference.

The intermediate support member 91C has a step having a difference in positions in the thickness direction between the inner periphery and the outer periphery. In other words, the intermediate support member 91C includes an outer periphery 101 and an inner periphery 102 on the inner side of the outer periphery 101, with the outer periphery 101 shifted to the front of the inner periphery 102. The thickness of the intermediate support member 91C is uniform, and the thickness of the inner periphery 102 and the thickness of the outer periphery 101 are substantially the same.

In the fourth embodiment, the fixing member FM (support wall 21G) of the motor housing 21 includes: an outer peripheral placement portion 103 coming in contact with the rear surface of the outer periphery 101 of the intermediate support member 91C: and an inner peripheral placement portion 104 coming in contact with the rear surface of the inner periphery 102 of the intermediate support member 91C. Regarding the relationship between the outer peripheral placement portion 103 and the inner peripheral placement portion 104, the outer peripheral placement portion 103 is shifted to the front of the inner peripheral placement portion 104 in accordance with the positional shift between the outer periphery 101 and the inner periphery 102 in the front-rear direction.

In the fourth embodiment, the position of the peripheral wall constituting the accommodating recess 85 of the case 4 is also shifted to the front corresponding to the outer periphery of the intermediate support member 91C and the outer peripheral placement portion 103 of the motor housing 21. As a result, a depth (depth from the rear surface to the front) D3 of the accommodating recess 85 of the case 4 is smaller than a thickness D4 of the bearing 38F in the front-rear direction. The bearing 38F protrudes rearward from the rear end of the accommodating recess 85. The rear end of the bearing 38F is positioned more rearward than the outer periphery 101 of the intermediate support member 91C and comes in contact with the front surface of the inner periphery 102 of the intermediate support member 91C.

In this structure, a rearward thrust load acting on the bearing 38F is applied to the inner periphery 102 of the intermediate support member 91C. The intermediate support member 91C is in contact with the motor housing 21 at both the inner periphery 102 and the outer periphery 101. Therefore, the thrust load applied to the intermediate support member 91C is supported by the inner peripheral placement portion 104 and the outer peripheral placement portion 103 at both the inner periphery 102 and the outer periphery 101, respectively.

In the fourth embodiment, the outer peripheral placement portion 103 is shifted to the front side, and thus, the thickness achieved for supporting the thrust load on the support wall 21G of the motor housing 21 can be provided on the front side. Accordingly, the rear surface of the support wall 21G of the motor housing 21 can have a shape that does not protrude rearward, making it possible to easily obtain the installation space for the fan 12.

Fifth Embodiment

A fifth embodiment will be described. In the following description, the same or equivalent components as those of the above-described embodiment are denoted by the same reference numerals, and the description of the components is simplified or omitted.

Figure 28:
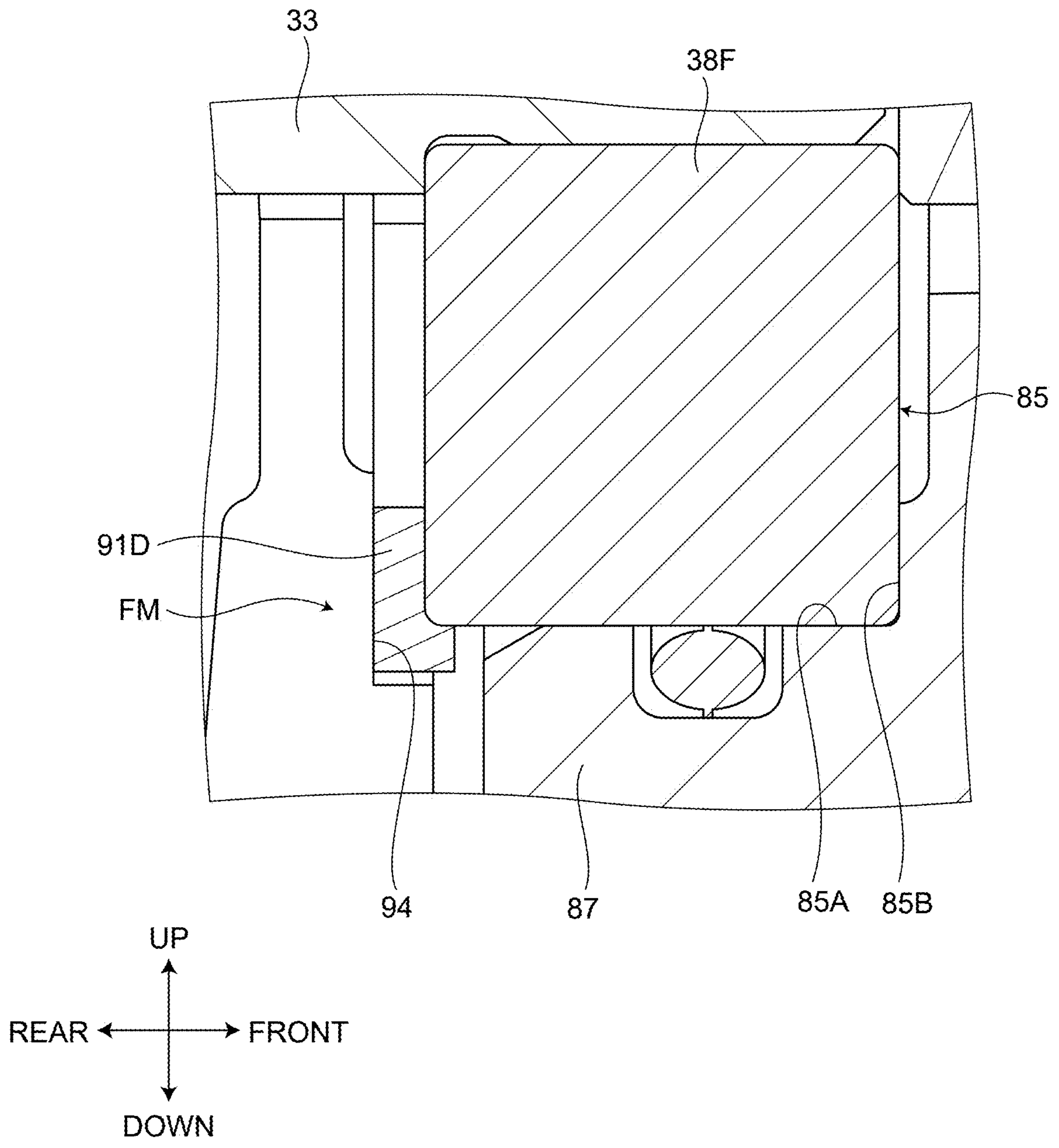
FIG. 28 is a longitudinal sectional view illustrating an intermediate support member and a fixing member according to a fifth embodiment.

FIG. 28 is a longitudinal sectional view illustrating an intermediate support member 91D and the fixing member FM according to the fifth embodiment.

Although the first embodiment has described an example in which the fixing member FM, among the intermediate support member 91 and the fixing member FM, is elastically deformed, the fifth embodiment will describe an example in which the intermediate support member 91D, among the intermediate support member 91D and the fixing member FM, is elastically deformed.

In the fifth embodiment, the intermediate support member 91D is formed of resin. The fixing member FM is formed of metal. The fixing member FM clamps the intermediate support member 91D while elastically deforming the intermediate support member 91D. In the fifth embodiment, the bearing 38F is a sliding bearing.

In the fifth embodiment, the intermediate support member 91D and the bearing 38F are held by being clamped between the metal case 4 and the metal fixing member FM in the front-rear direction. The fixing member FM, together with the case 4, fixes the intermediate support member 91D only by clamping.

The intermediate support member 91D is elastically deformed by being clamped between the fixing member FM and the bearing 38F. The intermediate support member 91D is deformed such that the rear surface of the bearing 38F is pressed into the front surface of the intermediate support member 91D. This makes it possible to prevent occurrence of a gap (backlash) in the front-rear of the bearing 38F between the fixing member FM and the case 4.

Effects

As described above, in the fifth embodiment, the intermediate support member 91D is formed of resin, and the fixing member FM is formed of metal and clamps the intermediate support member 91D while elastically deforming the intermediate support member 91D.

In the above configuration, by using the intermediate support member 91D as a spacer or a cushion, it is possible to prevent occurrence of a gap (backlash) in the thrust load acting direction of the bearing 38F.

Sixth Embodiment

A sixth embodiment will be described. In the following description, the same or equivalent components as those of the above-described embodiment are denoted by the same reference numerals, and the description of the components is simplified or omitted.

Figure 29:
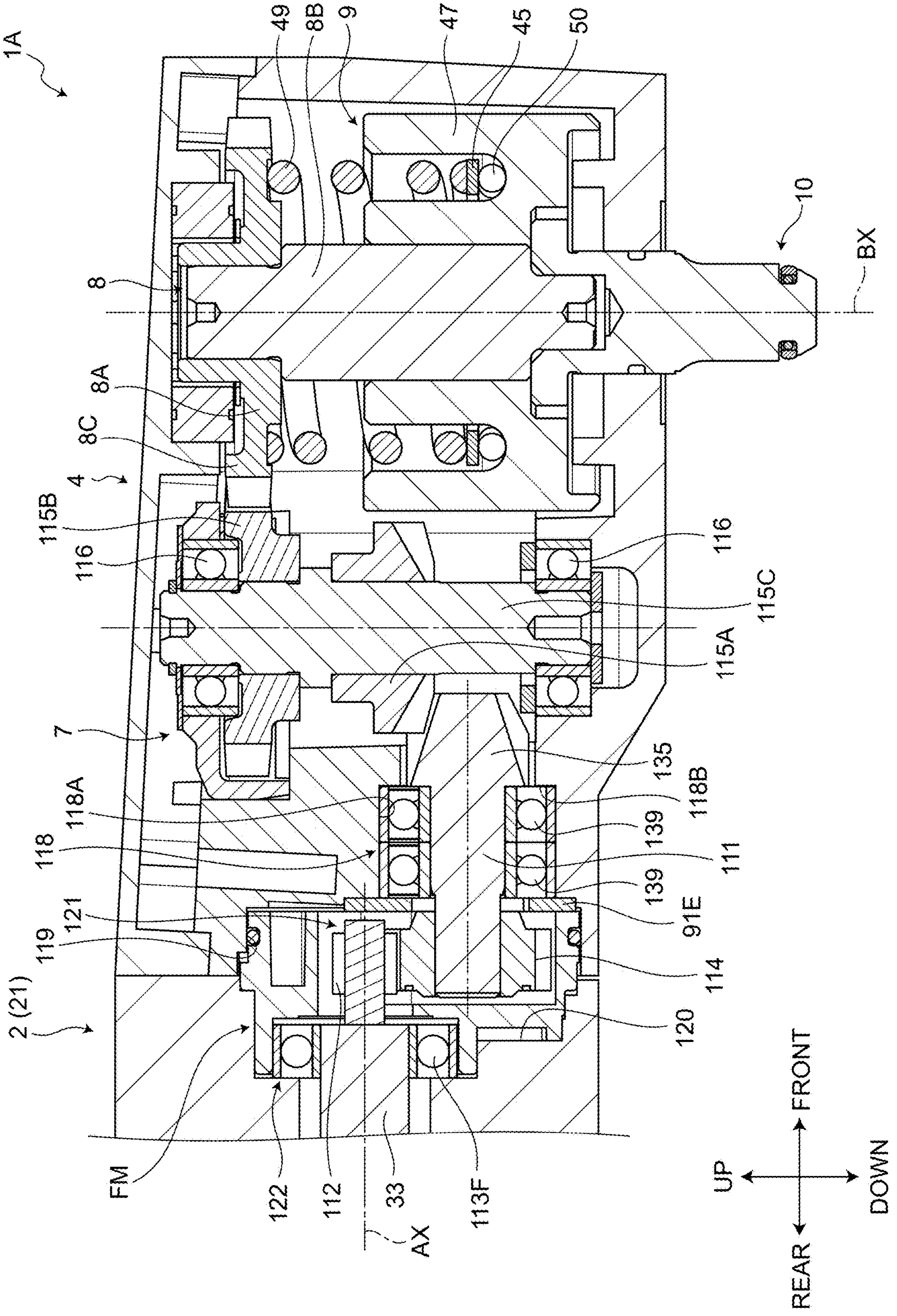
FIG. 29 is a longitudinal sectional view illustrating a front portion of an electric power tool according to a sixth embodiment.

FIG. 29 is a longitudinal sectional view illustrating a front portion of an electric power tool 1A according to the sixth embodiment.

In the first embodiment, the bevel gear 35 is the pinion gear fixed to the rotor shaft 33. However, in the sixth embodiment, a bevel gear 135 is provided separately from the pinion gear fixed to the rotor shaft 33, and the bevel gear 135 is provided on a shaft different from the rotor shaft 33.

The electric power tool 1A according to the sixth embodiment includes a bevel gear 135 that is indirectly rotated by the rotor 27 and has a shaft 111 extending in the front-rear direction. The electric power tool 1A includes a spur gear 112 which is a pinion gear directly rotated by the rotor 27. The bevel gear 135 rotates about the shaft 111 by the rotational force of the spur gear 112.

The spur gear 112 is fixed to the rotor shaft 33. The spur gear 112 is fixed by being press-fitted into the tip of the rotor shaft 33. The spur gear 112 rotates together with the rotor 27

(rotor shaft 33). The rotor shaft 33 is rotatably held by a rotor bearing 113F. The spur gear 112 meshes with a driven gear 114.

The driven gear 114 is a spur gear. The driven gear 114 is fixed to the rear end of the shaft 111. The driven gear 114 is fixed by being press-fitted to the rear end of the shaft 111. The driven gear 114 rotates together with the shaft 111 and the bevel gear 135. The driven gear 114 rotates to decelerate the rotation of the spur gear 112. The driven gear 114 constitutes a first-stage speed reducer of the speed reducing mechanism 7.

The shaft 111 extends in the front-rear direction. The shaft 111 is parallel to the rotation axis AX of the motor 6. The shaft 111 is accommodated in the case 4. The shaft 111 is disposed at a position offset from the rotation axis AX in the radial direction.

The bevel gear 135 is disposed forward of the spur gear 112 and the driven gear 114. The bevel gear 135 is integrally formed at the tip of the shaft 111 or is separately fixed to the tip of the shaft 111. The bevel gear 135 is accommodated in the case 4. The bevel gear 135 rotates about the central axis of the shaft 111. The bevel gear 135 meshes with a first intermediate gear 115A provided on an intermediate shaft 115C.

The intermediate shaft 115C extends in a direction intersecting the rotation axis AX and the shaft 111. The intermediate shaft 115C extends in the up-down direction orthogonal to the rotation axis AX and the shaft 111, and is rotatable around a central axis in the up-down direction. Both ends of the intermediate shaft 115C are rotatably supported by respective intermediate bearings 116. The intermediate bearings 116 are held by the case 4. The first intermediate gear 115A and a second intermediate gear 115B are fixed to the intermediate shaft 115C. The intermediate shaft 115C, the first intermediate gear 115A, and the second intermediate gear 115B rotate together. The first intermediate gear 115A meshes with the bevel gear 135. The first intermediate gear 115A is a bevel gear. The first intermediate gear 115A rotates to decelerate the rotation of the bevel gear 135. The bevel gear 135 and the first intermediate gear 115A constitute a second-stage speed reducer of the speed reducing mechanism 7. The second intermediate gear 115B is a spur gear. The second intermediate gear 115B meshes with the spindle gear 8C of the spindle 8. The spindle gear 8C rotates to decelerate the rotation of the second intermediate gear 115B. The second intermediate gear 115B and the spindle gear 8C constitute a third-stage speed reducer of the speed reducing mechanism 7.

Bearings 139 are supported by the case 4 and holds the bevel gear 135 to be rotatable. The bearings 139 come in contact with the shaft 111 and support the shaft 111 to be rotatable. The bearings 139 hold the bevel gear 135 to be rotatable via the shaft 111.

The bearings 139 are accommodated in an accommodating recess 118 of the case 4. The accommodating recess 118 has a radial support surface 118A and a front support surface 118B. The bearings 139 are ball bearings. In the example of FIG. 29, two bearings 139 are aligned in the axial direction.

An intermediate support member 91E has a front surface coming in contact with the bearing 139. The intermediate support member 91E may be C-shaped or hoop-shaped. In the sixth embodiment, the intermediate support member 91E is accommodated in the case 4. The intermediate support member 91E covers a part of the rear surface opening of the accommodating recess 118. The intermediate support member 91E comes in contact with the rear end surface of the outer ring of the rear bearing 139 disposed in the accommodating recess 118.

In the sixth embodiment, the fixing member FM is provided separately from the motor housing 21 and the case 4. In the sixth embodiment, the fixing member FM is a gear case formed of metal and accommodating the spur gear 112 and the driven gear 114. The fixing member FM is disposed between the case 4 and the motor housing 21 so as to straddle the case 4 and the motor housing 21 in the front-rear direction.

The fixing member FM includes: a first accommodating chamber 121 recessed rearward from the front surface; and a second accommodating chamber 122 recessed forward from the rear surface. The first accommodating chamber 121 accommodates the spur gear 112 and the driven gear 114. The second accommodating chamber 122 accommodates the rotor bearing 113F. The second accommodating chamber 122 is continuous with the first accommodating chamber 121 in the front-rear direction. The distal end of the rotor shaft 33 passes through the second accommodating chamber 122 to be disposed in the first accommodating chamber 121.

The case 4 has a front accommodating portion 119 that accommodates the front portion of the fixing member FM. The front accommodating portion 119 is a recess recessed forward from the rear surface of the case 4. The accommodating recess 118 of the bearing 139 is formed on a front-side wall surface corresponding to the bottom surface of the front accommodating portion 119. The front accommodating portion 119 and the accommodating recess 118 are continuous with each other. Therefore, the intermediate support member 91E is disposed on the front-side wall surface corresponding to the bottom surface of the front accommodating portion 119. The front portion of the fixing member FM is fitted into the front accommodating portion 119. With this configuration, the fixing member FM comes into contact with the rear surface of the intermediate support member 91E on the front surface thereof. The fixing member FM comes in contact with the rear surface of the intermediate support member 91E at a portion of the front end surface of the peripheral wall defining the first accommodating chamber 121.

The motor housing 21 includes a rear accommodating portion 120 that accommodates the rear portion of the fixing member FM. The rear accommodating portion 120 is a recess recessed rearward from the front surface of the motor housing 21. The rear portion of the fixing member FM is fitted into the rear accommodating portion 120. Although not illustrated, similarly to the first embodiment, the motor housing 21 and the case 4 are connected with each other in the front-rear direction and are fastened to each other by screws 70 directed in the front-rear direction. The motor housing 21 and the case 4 are tightened in directions approaching each other in the front-rear direction by the axial force of the screws 70. As a result, the bearing 139, the intermediate support member 91E, and the fixing member FM are located between the motor housing 21 and the case 4, and are clamped by the axial force of the screws 70. As a result, the fixing member FM, together with the case 4, fixes the intermediate support member 91E only by clamping. The intermediate support member 91E is merely disposed in the front accommodating portion 119, and is fixed by being clamped between the front surface of the fixing member FM and the front support surface 118B of the case 4 together with the bearing 139.

Other Embodiments

In the above-described embodiment(s), the plurality of light emitters 53 need not be arrayed in the circumferential direction of the anvil 10. The plurality of light emitters 53 may be arrayed in the radial direction of the anvil 10, for example. The optical member 57 need not have a hoop shape surrounding the anvil 10, and may have a shape corresponding to the arrangement of the plurality of light emitters 53. The optical member 57 may have, for example, an arc shape, a quadrangular shape, or a radial shape. The optical member 57 may be individually provided for each of the plurality of light emitters 53. The plurality of light emitters 53 only needs to be held in the case 4, and may be disposed at a position such as at a rear portion of a lower surface of the case 4 or at a lower portion of a side surface. For example, the light emitters 53 may emit light obliquely downward from the rear portion of the lower surface of the case 4 toward the lower side of the anvil 10. The light emitters 53 need not be provided in plurality, and may be provided as a single light emitter.

In the embodiment(s) described above, the electric power tool 1 is an impact wrench. Alternatively, the electric power tool 1 may be an impact driver. When the electric power tool 1 is an impact driver, the tool accessory holder 51 includes a bit hole provided at the lower end of the anvil shaft 10A. The bit hole is provided so as to extend rearward from the front end of the anvil shaft 10A. A driver bit, which is a tool accessory, is held in a state of being inserted into the bit hole. In this case, the tool accessory holder 51 can include a tool holding mechanism that is inserted into the bit hole to detachably hold the driver bit.

The electric power tool 1 may be an electric power tool other than the impact tool. In other words, the electric power tool 1 may omit the impacting mechanism 9 including the hammer 47 and the anvil 10. In this case, the tool accessory holder 51 may be provided at the tip of the spindle 8 and rotate integrally with the spindle 8, or may be provided separately from the spindle 8 and rotated by the spindle 8 via a power transmission mechanism. Examples of the electric power tool 1 other than the impact tool include an electric ratchet wrench, an electric angle grinder, and an electric angle drill.

In the above-described embodiment(s), the support wall 21G indirectly supports the rear surface of the bearing 38F via the intermediate support member 91. Alternatively, the intermediate support member 91 may be omitted, and the support wall 21G may directly support the rear surface of the bearing 38F.

In the above-described embodiment, the power supply of the electric power tool 1 may be a commercial power supply (AC power supply) instead of the battery pack 25.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric power tool comprising:

a grip extending in a front-rear direction;

a motor housing disposed forward of the grip;

a motor disposed inside the motor housing and including a stator and a rotor, the rotor being rotatable with respect to the stator;

a bevel gear configured to rotate integrally with the rotor and including a shaft extending in the front-rear direction;

a spindle rotated by rotational force of the rotor transmitted via the bevel gear and extending in a direction intersecting the front-rear direction;

a tool accessory holder rotated by the spindle;

a case to accommodate the bevel gear and the spindle; and a bearing held by the case and configured to hold the bevel gear to be rotatable; wherein the case includes: a radial support surface to support a radial load acting on the bearing and a front support surface to support a forward thrust load acting on the bearing;

the motor housing and the case are connected to each other in the front-rear direction; and the motor housing includes a rear support surface to support a rearward thrust load acting on the bearing.

2. The electric power tool according to claim 1, further comprising:

a hammer rotated by the spindle; and an anvil to be impacted in a rotation direction by the hammer, wherein the tool accessory holder is disposed at a lower end of the anvil, and the case accommodates the bevel gear, the spindle, and the hammer.

3. The electric power tool according to claim 1, wherein the rotor includes a rotor shaft extending in the front-rear direction, the rotor shaft extends from the motor housing to an internal space of the case, and the bevel gear is fixed to the rotor shaft.

4. The electric power tool according to claim 3, wherein the bearing comes in contact with the rotor shaft and holds the bevel gear to be rotatable via the rotor shaft.

5. The electric power tool according to claim 1, further comprising an intermediate shaft disposed between the bevel gear and the spindle and configured to transmit rotation of the bevel gear to the spindle, wherein the intermediate shaft is accommodated in the case and extends in a direction intersecting the front-rear direction.

6. The electric power tool according to claim 1, further comprising:

a first intermediate shaft that includes a driven gear meshing with the bevel gear and that is configured to decelerate rotation of the bevel gear; and a second intermediate shaft configured to decelerate rotation of the first intermediate shaft and transmits the rotation to the spindle.

7. The electric power tool according to claim 1, wherein the spindle extends in a direction orthogonal to the front-rear direction.

8. An electric power tool comprising:

a grip extending in a front-rear direction;

a motor housing disposed forward of the grip;

a motor disposed inside the motor housing and including a stator and a rotor, the rotor being rotatable with respect to the stator;

a pinion gear configured to rotate integrally with the rotor;

a speed reducing mechanism connected to the pinion gear;

a spindle connected to the speed reducing mechanism and extending in a direction intersecting the front-rear direction;

a tool accessory holder rotated by the spindle;

a case to accommodate the pinion gear, the speed reducing mechanism, and the spindle; and a bearing held by the case and configured to hold the pinion gear to be rotatable; wherein the motor housing and the case are connected to each other in a front-rear direction;

the bearing is clamped between the motor housing and the case;

the case has an accommodating recess being recessed forward from a rear portion of the case and configured to accommodate the bearing; and the motor housing includes a support wall to support a rear surface of the bearing on a front surface of the motor housing.

9. The electric power tool according to claim 8, wherein the speed reducing mechanism includes:

a first speed reducer connected to the pinion gear and configured to rotate to decelerate the rotation of the pinion gear; and a second speed reducer configured to decelerate the rotation of the first speed reducer and transmit the rotation to the spindle.

10. An electric power tool comprising:

a grip extending in a front-rear direction;

a motor housing disposed forward of the grip;

a motor disposed inside the motor housing and including a stator and a rotor, the rotor being rotatable with respect to the stator;

a bevel gear rotated by the rotor and including a shaft extending in the front-rear direction;

a spindle rotated by rotational force of the rotor transmitted via the bevel gear and extending in a direction intersecting the front-rear direction;

a tool accessory holder rotated by the spindle;

a case to accommodate the bevel gear and the spindle;

a bearing held by the case and configured to hold the bevel gear to be rotatable;

an intermediate support member having a front surface coming in contact with the bearing; and a fixing member coming in contact with a rear surface of the intermediate support member to fix the intermediate support member, together with the case, only by clamping.

11. The electric power tool according to claim 10, wherein one of the intermediate support member or the fixing member elastically deforms the other.

12. The electric power tool according to claim 11, wherein the bearing includes a ball bearing having an inner ring, an outer ring, and balls, the intermediate support member is formed of metal and comes into contact with the outer ring, and the fixing member is formed of resin, and is elastically deformed to clamp the intermediate support member.

13. The electric power tool according to claim 12, wherein a width of a rear surface of the intermediate support member in a radial direction is greater than a width of the outer ring in the radial direction.

14. The electric power tool according to claim 11, wherein the intermediate support member is formed of resin, and the fixing member is formed of metal, and clamps the intermediate support member while elastically deforming the intermediate support member.

15. The electric power tool according to claim 10, wherein the rotor includes a rotor shaft extending in the front-rear direction, and the intermediate support member is provided so as to surround a periphery of the rotor shaft along a rear surface of the bearing, and has a C-shape including two ends, being one end and the other end.

16. The electric power tool according to claim 10, wherein the intermediate support member has a hoop shape along a rear surface of the bearing.

17. The electric power tool according to claim 10, wherein the fixing member is integrally formed with the motor housing.

* * * * *